(12) United States Patent
Takanami et al.

(10) Patent No.: US 8,688,337 B2
(45) Date of Patent: Apr. 1, 2014

(54) DRIVING FORCE CONTROL DEVICE

(75) Inventors: Yoji Takanami, Anjyou (JP); Tomoyuki Honda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 128 days.

(21) Appl. No.: 13/263,930

(22) PCT Filed: Apr. 13, 2009

(86) PCT No.: PCT/JP2009/057456
§ 371 (c)(1),
(2), (4) Date: Oct. 11, 2011

(87) PCT Pub. No.: WO2010/119498
PCT Pub. Date: Oct. 21, 2010

(65) Prior Publication Data
US 2012/0035818 A1     Feb. 9, 2012

(51) Int. Cl.
*G06F 7/00* (2006.01)
*G06F 17/00* (2006.01)
*G06F 19/00* (2011.01)

(52) U.S. Cl.
USPC .............. 701/54; 701/102; 180/65.28; 477/3

(58) Field of Classification Search
USPC ........................................... 701/54, 102, 104
See application file for complete search history.

(56) References Cited

U.S. PATENT DOCUMENTS

| | | | | |
|---|---|---|---|---|
| 3,794,133 A | * | 2/1974 | Sugiura et al. ............... | 180/65.8 |
| 4,774,858 A | * | 10/1988 | Ganoung ......................... | 477/32 |
| 4,890,516 A | * | 1/1990 | Suzuki ............................. | 477/46 |
| 4,964,318 A | * | 10/1990 | Ganoung ....................... | 477/110 |
| 5,749,346 A | * | 5/1998 | Halvorson et al. ............ | 123/486 |
| 6,656,082 B1 | * | 12/2003 | Yamada et al. ................... | 477/5 |

(Continued)

FOREIGN PATENT DOCUMENTS

| CN | 102395496 A | * | 3/2012 |
|---|---|---|---|
| JP | A-59-190550 | | 10/1984 |

(Continued)

OTHER PUBLICATIONS

Sensorless Control of BLDC Motor Drive for an Automotive Fuel Pump Using a Hysteresis Comparator ; Tae-Won Chun ; Quang-Vinh Tran ; Hong-Hee Lee ; Heung-Geun Kim; Power Electronics, IEEE Transactions on; vol. 29 , Issue: 3 Digital Object Identifier: 10.1109/TPEL.2013.2261554; Publication Year: 2014 , pp. 1382-1391.*

(Continued)

*Primary Examiner* — Cuong H Nguyen
(74) *Attorney, Agent, or Firm* — Oliff PLC

(57) ABSTRACT

A driving force control device for controlling engine torque generated by an internal combustion engine mounted on a vehicle and the engine revolution speed of the internal combustion engine based on the operation amount of driving force request operation on the vehicle to control the driving force of the vehicle is characterized by executing revolution fluctuation suppression control that suppresses fluctuations in engine revolution speeds when the operating point of the internal combustion engine in accordance with the engine torque and the engine revolution speed is within an optimum fuel economy range being a region set with a specified hysteresis width relative to an optimum fuel economy line of the internal combustion engine; accordingly, it is possible to improve the efficiency of the whole driving system.

10 Claims, 16 Drawing Sheets

(56) References Cited

U.S. PATENT DOCUMENTS

| | | | |
|---|---|---|---|
| 7,256,563 B2 * | 8/2007 | Kuehner et al. | 318/432 |
| 8,298,121 B2 * | 10/2012 | Kojima et al. | 477/174 |
| 2002/0123836 A1 | 9/2002 | Komiyama et al. | |
| 2007/0042861 A1 * | 2/2007 | Takaoka et al. | 477/3 |
| 2010/0137100 A1 * | 6/2010 | Kojima et al. | 477/38 |
| 2012/0035818 A1 * | 2/2012 | Takanami et al. | 701/54 |

FOREIGN PATENT DOCUMENTS

| | | | |
|---|---|---|---|
| JP | 63028740 A | * | 2/1988 |
| JP | A-63-130441 | | 6/1988 |
| JP | 10273919 A | * | 10/1998 |
| JP | A-11-218215 | | 8/1999 |
| JP | 2001082210 A | * | 3/2001 |
| JP | A-2001-328464 | | 11/2001 |
| JP | 2001-354051 A | * | 12/2001 |
| JP | A-2001-354051 | | 12/2001 |
| JP | A-2002-122220 | | 4/2002 |
| JP | A-2002-254962 | | 9/2002 |
| JP | A-2003-146115 | | 5/2003 |
| JP | A-2004-324842 | | 11/2004 |
| JP | 2009298266 A | * | 12/2009 |
| WO | WO 2010119498 A1 | * | 10/2010 |

OTHER PUBLICATIONS

Improvement of direct torque control by using double-fuzzy logic technique; Min Fu ; Ji Wang ; Cang Ge ; Yuxin Xue Strategic Technology (IFOST), 2011 6th International Forum on; vol. 2; Digital Object Identifier: 10.1109/IFOST.2011.6021179 Publication Year: 2011 , pp. 957-962.*

A Direct Torque Controlled Induction Motor with Variable Hysteresis Band; Mohanty, K.B.; Computer Modelling and Simulation, 2009. UKSIM '09. 11th International Conference on; Digital Object Identifier: 10.1109/UKSIM.2009.24 Publication Year: 2009 , pp. 405-410.*

Design of Fault Diagnosis Instrument for Speed Control System Based on Virtual Instrument; Di Chang-an ; Jiang Dong-dong ; Kong De-ren; Cryptography and Network Security, Data Mining and Knowledge Discovery, E-Commerce & Its Appl. & Embedded Systems (CDEE), 2010 First ACIS Inter. Symposium on; Digital Obj. Id: 10.1109/CD, pp. 337-340.*

International Search Report mailed May 19, 2009 issued in International Patent Application No. PCT/JP2009/057456 (with translation).

* cited by examiner

DRIVING FORCE CONTROL DEVICE

FIELD

The present invention relates to a driving force control device, and particularly relates to a driving force control device for controlling the driving force of a vehicle.

BACKGROUND

As a conventional driving force control device for controlling the driving force of a vehicle such as a passenger car and a truck, for example, a driving force control device for a vehicle described in Patent Literature 1 controls a transmission ratio in accordance with an operating point on a shift line set on a low revolution side in a practical region relative to an optimum fuel economy line obtained based on the efficiency of an engine and a continuously variable transmission and accordingly suppresses an increase in revolutions from the start of the practical range. As a result, the driving force control device for a vehicle described in Patent Literature 1 can suppress fuel consumption by the inertia torque incident to fluctuations in engine revolutions, in other words, fluctuations in the revolutions of an input shaft of a continuously variable transmission, and efficiency as a whole is increased compared with a case of controlling the transmission ratio at an operating point on the optimum fuel economy line, and the fuel economy is improved.

CITATION LIST

Patent Literature

Patent Literature 1: Japanese Patent Application Laid-open No. 2001-328464

SUMMARY

Technical Problem

Incidentally, in the driving force control device for a vehicle described in the above-mentioned Patent Literature 1, for example, there is a limit to reduce fluctuations in the inertia torque of an engine since the transmission ratio is controlled at an operating point on the set shift line. Therefore, in such a conventional driving force control device, a further improvement in the efficiency of the whole driving system has been desired.

Accordingly, an object of the present invention is to provide a driving force control device that can improve the efficiency of the whole driving system.

Solution to Problem

In order to achieve the above mentioned object, a driving force control device, according to the present invention, that controls engine torque generated by an internal combustion engine mounted on a vehicle and an engine revolution speed of the internal combustion engine based on an operation amount of driving force request operation on the vehicle to control driving force of the vehicle, includes executing revolution fluctuation suppression control that suppresses fluctuations in the engine revolution speeds when an operating point of the internal combustion engine in accordance with the engine torque and the engine revolution speed is within an optimum fuel economy range which is a region set with a specified hysteresis width relative to an optimum fuel economy line of the internal combustion engine.

In addition, the driving force control device may further include a target control amount calculating means that calculates an internal combustion engine target control amount of the internal combustion engine and a transmission target control amount of a transmission to which revolution output of the internal combustion engine is transferred and which shifts the engine revolution speed, based on the operation amount of the driving force request operation; an engine control means that controls output of the internal combustion engine based on the internal combustion engine target control amount; and a shift control means that controls shifting of the transmission based on the transmission target control amount, wherein the target control amount calculation means may calculate the transmission target control amount assuming that there is no change in the operation amount when the operating point of the internal combustion engine is within the optimum fuel economy range.

In addition, the driving force control device may further include a target control amount calculation means that calculates an internal combustion engine target control amount of the internal combustion engine and a transmission target control amount of a transmission to which revolution output of the internal combustion engine is transferred and which shifts the engine revolution speed, based on the operation amount of the driving force request operation; an engine control means that controls output of the internal combustion engine based on the internal combustion engine target control amount; and a shift control means that controls shifting of the transmission based on the transmission target control amount, wherein the target control amount calculation means may keep the transmission target control amount when the operating point of the internal combustion engine is within the optimum fuel economy range.

In addition, the driving force control device may further include a setting means that sets the specified hysteresis width based on a state of the vehicle.

In addition, in the driving force control device, the setting means may set the specified hysteresis width based on a loss incident to a fluctuation in the engine revolution speeds and engine efficiency of the internal combustion engine.

In addition, in the driving force control device, the setting means may set the specified hysteresis width based on an operating state of the vehicle.

In addition, in the driving force control device, the setting means may set the specified hysteresis width based on a driving orientation state to the vehicle.

In addition, in the driving force control device, the setting means may set the specified hysteresis width based on a running state of the vehicle.

In addition, in the driving force control device, the setting means may set the specified hysteresis width based on any one of a fluctuation width of a vehicle speed of the vehicle, a period during which the fluctuation width of the vehicle speed is within a preset first specified range, a period during which a fluctuation width of the operation amount of the driving force request operation on the vehicle is within a preset second specified range, distribution of driving force realized by the vehicle, speed limit information on a road where the vehicle runs, traffic information on a road where the vehicle runs, corner information on a road where the vehicle runs, and information on a distance between a running object running ahead of the vehicle and the vehicle.

Advantageous Effects of Invention

According to a driving force control device according to the present invention, it is possible to improve the efficiency of the whole driving system.

REFERENCE SIGNS LIST

1 VEHICLE
3 TRANSMISSION
10 ENGINE (INTERNAL COMBUSTION ENGINE)
10*a* ACCELERATOR PEDAL
51 ECU
100, 200, 300, 400, 500 DRIVING FORCE CONTROL DEVICE
110, 210, 310 TARGET CONTROL AMOUNT CALCULATING UNIT (TARGET CONTROL AMOUNT CALCULATING MEANS)
111, 211 TARGET THROTTLE OPENING CALCULATING UNIT
112, 212, 315 OPERATING POINT JUDGING UNIT
113, 214, 316 MEDIATING UNIT
114, 213, 314 TARGET ENGINE REVOLUTION CALCULATING UNIT
120 ENGINE CONTROL UNIT (ENGINE CONTROL MEANS)
130 TRANSMISSION CONTROL UNIT (TRANSMISSION CONTROL MEANS)
311 TARGET DRIVING FORCE CALCULATING UNIT
312 TARGET OUTPUT CALCULATING UNIT
313 TARGET ENGINE TORQUE CALCULATING UNIT
440, 540 HYSTERESIS WIDTH SETTING UNIT (SETTING MEANS)
441 ASSUMED LOSS CALCULATING UNIT
442 ACTUAL LOSS CALCULATING UNIT
443 ENGINE EFFICIENCY CALCULATING UNIT
444 COMPARISON/DETERMINATION UNIT
550 NAVIGATION DEVICE
551 RADAR
L OPTIMUM FUEL ECONOMY LINE
X OPTIMUM FUEL ECONOMY RANGE
α HYSTERESIS WIDTH

DESCRIPTION OF EMBODIMENTS

A detailed description will hereinafter be given of embodiments of a driving force control device according to the present invention based on the drawings. Incidentally, the present invention is not limited by the embodiments. Furthermore, elements in the following embodiments include those that can be replaced and are replaced easily by those skilled in the art or those that are substantially the same.

(First Embodiment)

Figure 1:
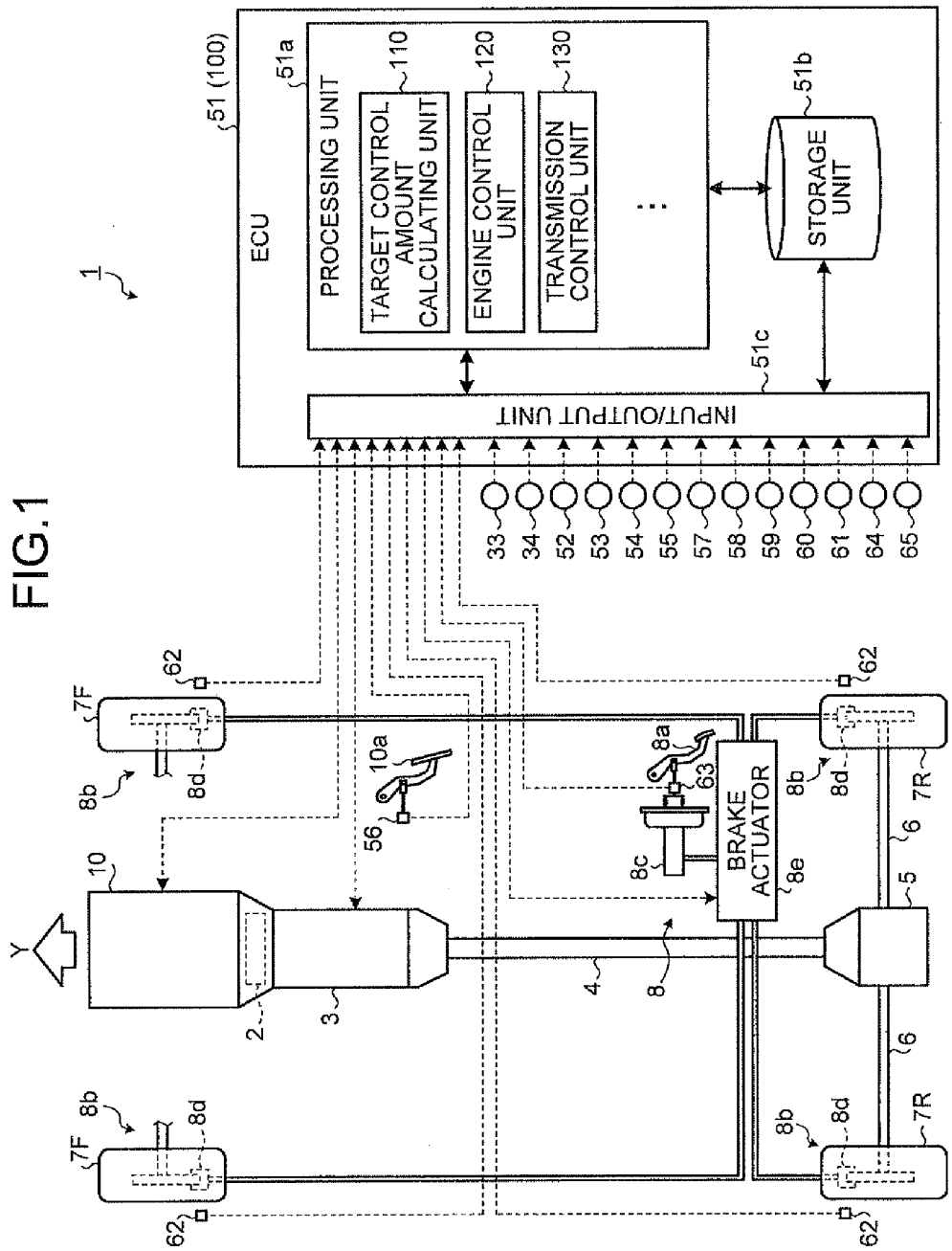
FIG. 1 is a schematic block diagram illustrating a vehicle to which a driving force control device according to a first embodiment of the present invention is applied.
Figure 2:
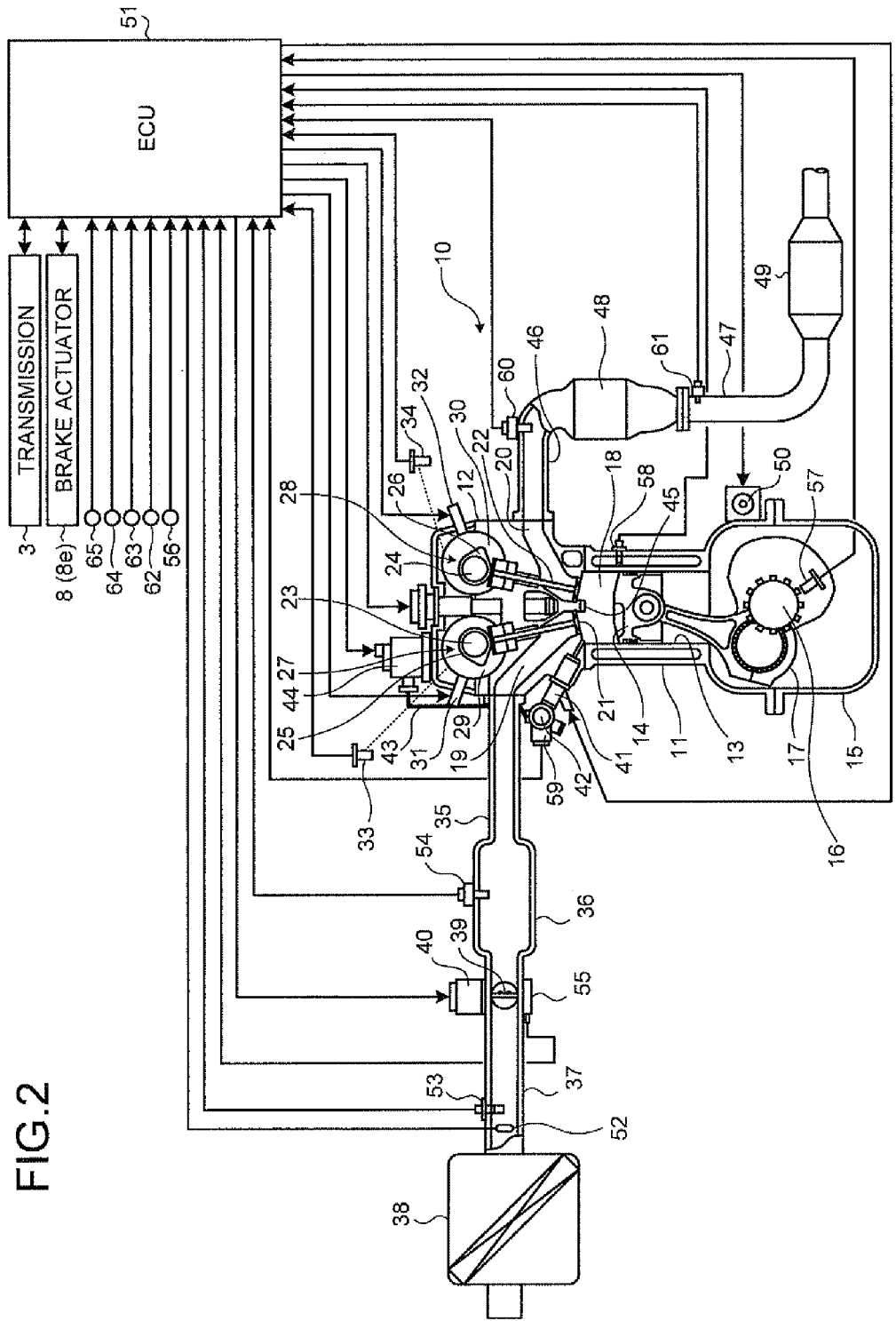
FIG. 2 is a schematic block diagram of an engine provided for the vehicle to which the driving force control device according to the first embodiment of the present invention is applied.
Figure 3:
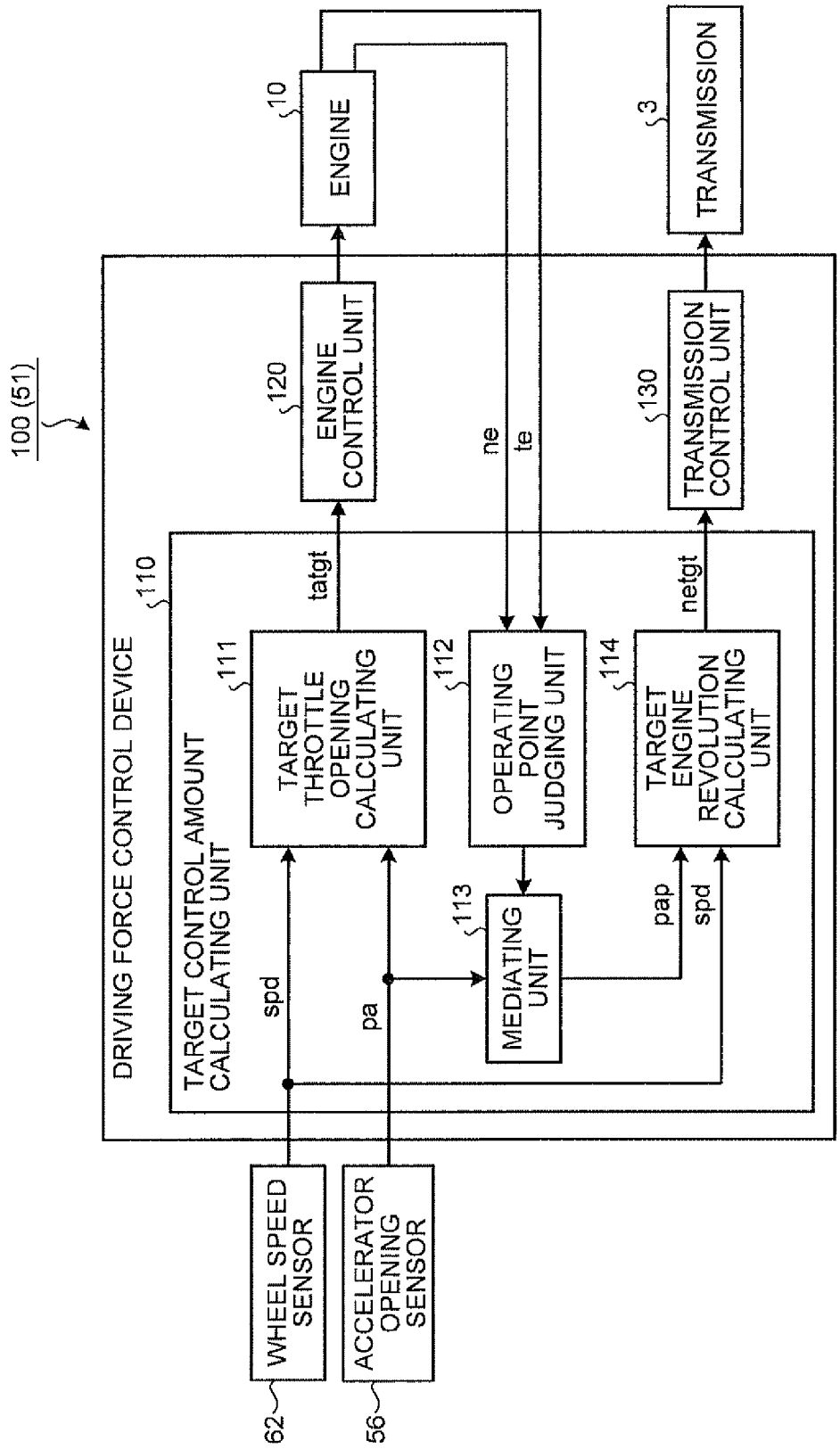
FIG. 3 is a schematic block diagram of the driving force control device according to the first embodiment of the present invention.
Figure 4:
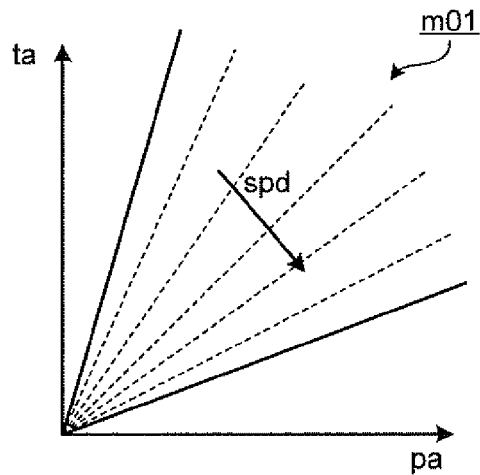
FIG. 4 is a throttle opening map of the driving force control device according to the first embodiment of the present invention.
Figure 5:
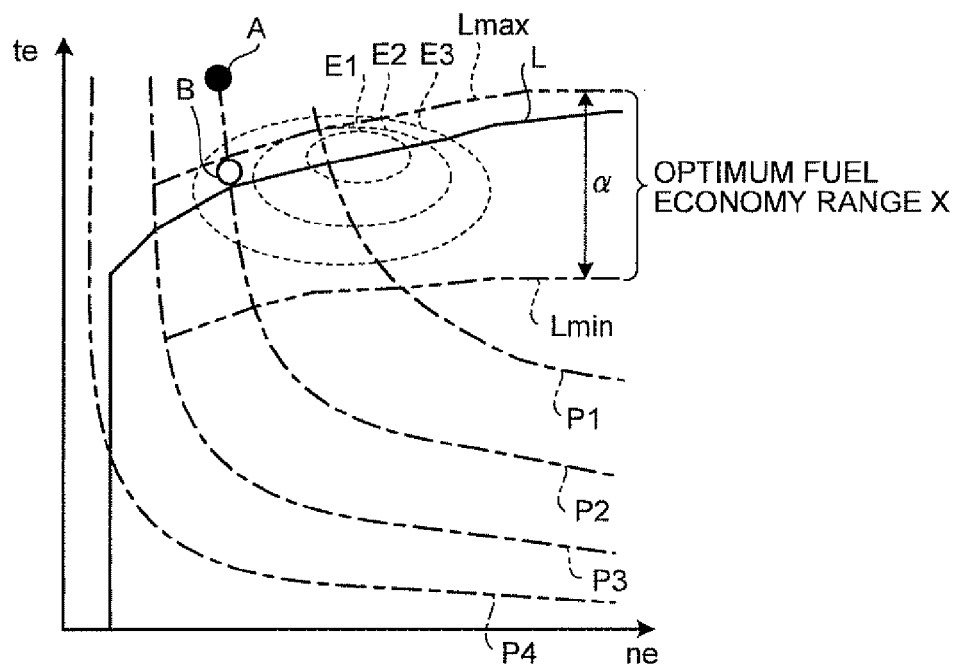
FIG. 5 is a diagram describing an optimum fuel economy range of the driving force control device according to the first embodiment of the present invention.
Figure 6:
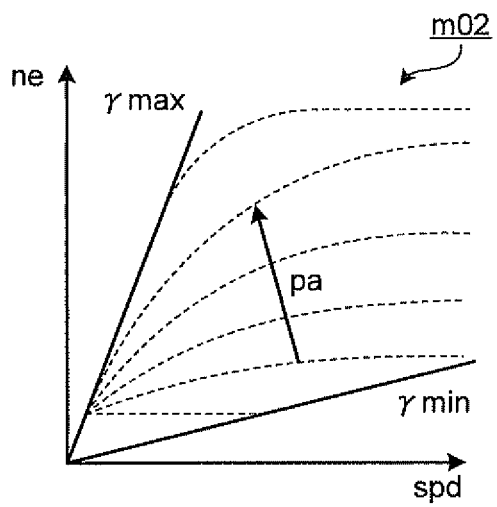
FIG. 6 is an engine revolution map of the driving force control device according to the first embodiment of the present invention.
Figure 7:
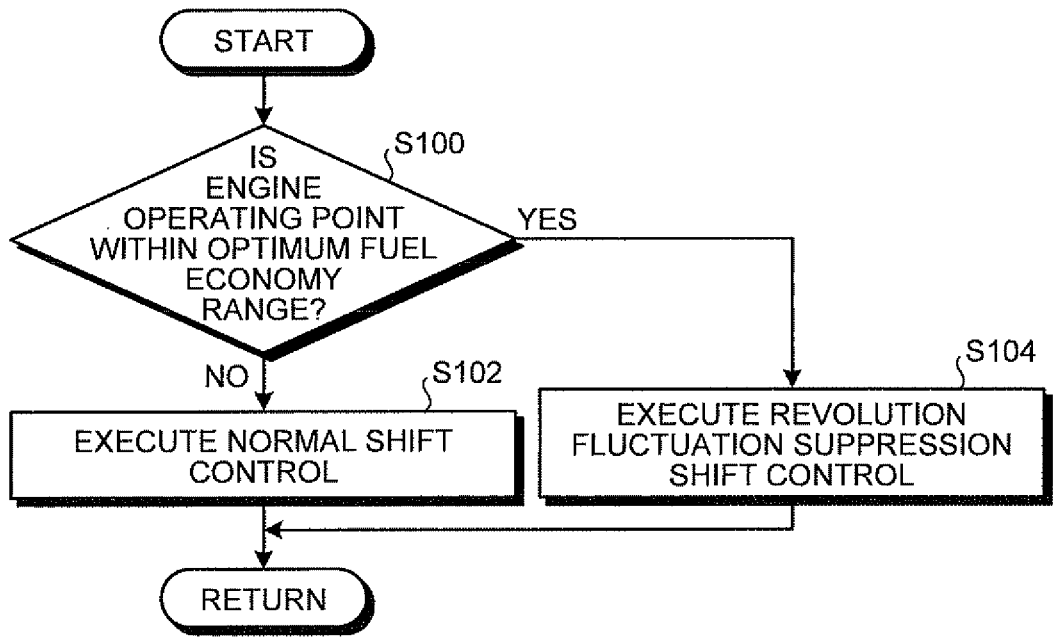
FIG. 7 is a flowchart describing the driving force control of the driving force control device according to the first embodiment of the present invention.
Figure 8:
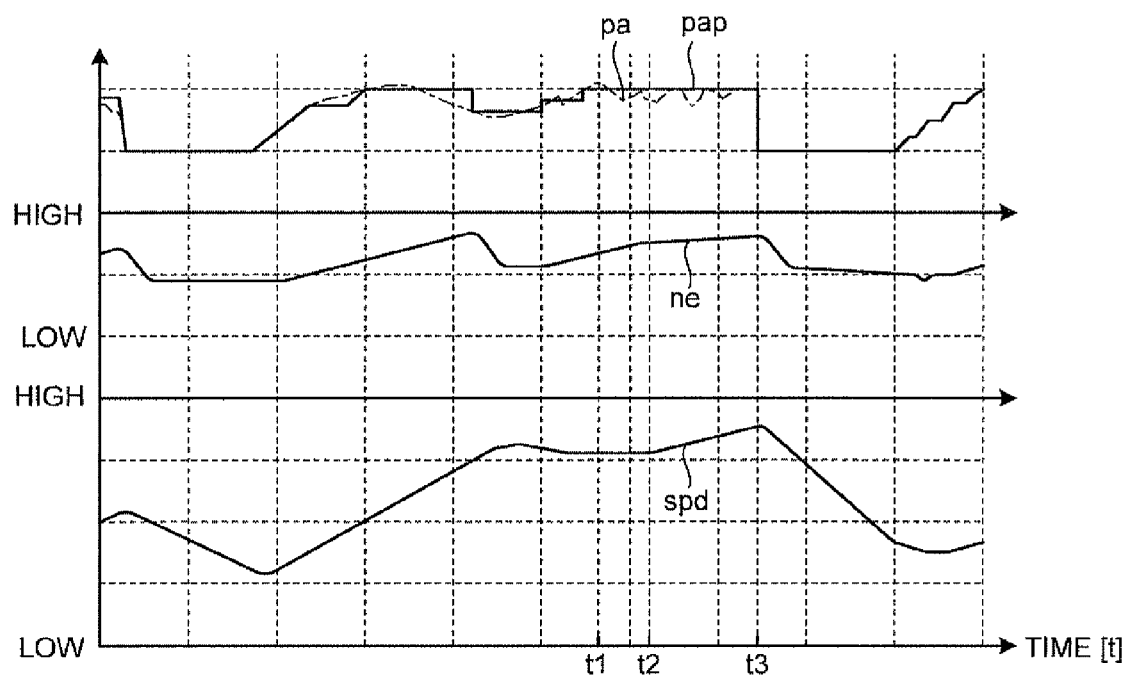
FIG. 8 is a time chart describing an example of the driving force control of the driving force control device according to the first embodiment of the present invention.

FIG. 1 is a schematic block diagram illustrating a vehicle to which a driving force control device according to a first embodiment of the present invention is applied. FIG. 2 is a schematic block diagram of an engine provided for the vehicle to which the driving force control device according to the first embodiment of the present invention is applied. FIG. 3 is a schematic block diagram of the driving force control device according to the first embodiment of the present invention. FIG. 4 is a throttle opening map of the driving force control device according to the first embodiment of the present invention. FIG. 5 is a diagram describing an optimum fuel economy range of the driving force control device according to the first embodiment of the present invention. FIG. 6 is an engine revolution map of the driving force control device according to the first embodiment of the present invention. FIG. 7 is a flowchart describing the driving force control of the driving force control device according the first embodiment of the present invention. FIG. 8 is a time chart describing an example of the driving force control of the driving force control device according the first embodiment of the present invention.

Incidentally, in the embodiments to be described later, as illustrated in FIG. 1, descriptions will be given of a case where a driving force control device 100 of the present invention is configured by being incorporated in an ECU 51. In other words, in the embodiments to be described later, the descriptions will be given of a case where the driving force control device is also used by the ECU 51. However, the driving force control device 100 of the present invention may be configured separately from the ECU 51, and may be configured in a manner of connecting to the ECU 51.

The driving force control device 100 according to the embodiment is mounted on a vehicle 1 such as a passenger car and a truck as illustrated in FIG. 1, and is for controlling the driving force of the vehicle 1. The driving force control device 100 is applied to a vehicle mounting a transmission to which power generated by power generating means is input via a torque converter.

Firstly, here, the vehicle 1 runs using an engine 10 being an internal combustion engine as a power generation source. In the embodiment, the engine 10 is a reciprocating spark-ignition internal combustion engine using gasoline as fuel; however, the engine 10 is not limited to this. For example, the engine 10 may be a spark-ignition internal combustion engine using LPG or alcohol as fuel, a so-called rotary spark-ignition internal combustion engine, or a diesel engine. Moreover, the vehicle 1 may be a hybrid vehicle equipped with an electric motor in addition to the engine 10 as a power generation source.

The vehicle 1 includes the engine 10 as an internal combustion engine, a torque converter 2, a transmission 3, a propeller shaft 4, a differential gear 5, rear-wheel drive shafts 6, wheels (front wheels) 7F, wheels (rear wheels) 7R, and a braking device 8.

The engine 10 is power generating means, is mounted on the vehicle 1, and is for generating driving force for each wheel 7R of the vehicle 1 in accordance with the operation of an accelerator pedal 10a as a driving operation member. The engine 10 is mounted forward in the direction of travel (the direction of the arrow Y in FIG. 1) of the vehicle 1, and drives the right and left wheels 7R via the torque converter 2, the transmission 3, the propeller shaft 4, the differential gear 5, and the rear-wheel drive shafts 6. Additionally, the right and left wheels 7F are the steering wheels of the vehicle 1. In this manner, the vehicle 1 adopts a drive system of the so-called FR (Front engine Rear drive). Incidentally, it is possible to apply the driving force control device 100 according to the embodiment to vehicles of various drive systems equipped with the engine 10 regardless of the drive systems. A detailed description will be given of the engine 10 in FIG. 2 to be described later.

The torque converter 2 is a type of hydraulic clutch, is provided on the output side of the engine 10, and is for transferring power output from the engine 10 via hydraulic fluids as fluid or directly. The torque converter 2 may have a lockup mechanism, for example, and transfers output torque (driving force) from the engine 10 increased at a specified torque ratio or output torque as it is to the transmission 3. In other words, power generated by the engine 10 is input to the transmission 3 via the torque converter 2.

The transmission 3 is provided on the output side of the engine 10, and is for shifting the output revolution speed of the engine 10 after the revolution output of the engine 10 is transferred thereto. To put it another way, the transmission 3 is provided on the output side of the engine 10 to transfer driving force from the engine 10, that is, output torque to a road surface on an optimum condition in accordance with the running state of the vehicle 1.

The transmission 3 may be a continuously variable transmission (CVT) that controls the transmission ratio being the ratio of the input revolution speed input to the transmission 3 to the output revolution speed output from the transmission 3 steplessly (continuously), or an automatic transmission (AT) that controls the transmission ratio stepwisely (discontinuously). As an automatic transmission, there is a stepped automatic transmission configured by combining a plurality of planetary gear devices and a clutch, for example. As a continuously variable transmission, there are a toroidal continuously variable transmission and a belt continuously variable transmission, for example. The toroidal continuously variable transmission is for transferring torque between disks via a power roller as a transfer member that is interposed between an input disk being a revolution member on an input side and an output disk being a revolution member on an output side while changing the transmission ratio by tilting the power roller. The belt continuously variable transmission is configured by a primary pulley being a revolution member on an input side where driving force from the engine 10 is transferred, a secondary pulley being a revolution member on an output side that changes and outputs the driving force transferred to the primary pulley, and a belt being a transfer member that transfers the driving force transferred to the primary pulley to the secondary pulley, and is for changing the transmission ratio by changing a contact radius with the belt and the pulleys. Incidentally, in addition to the above, as a continuously variable transmission, there is a stepless transmission mechanism that is provided for a hybrid vehicle and includes a plurality of planetary gear devices, and the like. The description will be given assuming that the transmission 3 of the embodiment is a continuously variable transmission that controls the transmission ratio steplessly (continuously) unless otherwise noted.

The propeller shaft 4 is for transferring power output from the transmission 3 to the wheels 7R in the rear (rear wheels) side. The propeller shaft 4 is coupled to the right and left rear-wheel drive shafts 6 via the differential gear 5. The rear-wheel drive shafts 6 are coupled to the wheels 7R being the right and left rear wheels. In the vehicle 1, the output torque of the engine 10 is transferred to each wheel 7R via the power train configured as above.

The braking device 8 is for generating braking force in the wheels 7F and 7R of the vehicle 1 in accordance with the operation of a brake pedal 8a. Each of the wheels 7F and 7R is provided with a hydraulic braking unit 8b of the braking device 8. Furthermore, for a hydraulic system of hydraulic fluids that connects a master cylinder 8c configuring the braking device 8 to wheel cylinders 8d of the hydraulic braking units 8b, a brake actuator 8e for increasing and decreasing hydraulic pressures inside the wheel cylinders 8d separately from the braking operation of the brake pedal 8a by a driver, and controlling braking force given to each of the wheels 7F and 7R via the hydraulic braking unit 8b made up of a brake pad, a brake rotor, and the like. In the vehicle 1, braking force is generated in the wheels 7F and 7R by the braking device 8 configured as above.

Next, as illustrated in FIG. 2, the engine 10 is a multi-cylinder injection engine that injects fuel spray directly into a combustion chamber 18 with a fuel injection valve 41 to be described later, and is a so-called four-cycle engine that makes a series of four strokes made up of the intake stroke, the compression stroke, the power stroke and the exhaust stroke while pistons 14 provided in cylinder bores 13 in a manner of being possible to reciprocate reciprocates twice.

In the engine 10, a cylinder head 12 is fastened onto a cylinder block 11, and the pistons 14 fit in the plurality of cylinder bores 13 formed in the cylinder block 11, respectively, in a manner of being able to move up and down. A crankcase 15 is fastened to a lower part of the cylinder block 11, a crankshaft 16 is supported rotatably in the crankcase 15, and each piston 14 is coupled to the crankshaft 16 via a connecting rod 17. Incidentally, oil supplied to each unit of the engine 10 is stored in the bottom of the crankcase 15.

The combustion chamber 18 is configured by a wall surface of the cylinder bore 13 in the cylinder block 11, a cylinder ceiling part as an undersurface of the cylinder head 12, and a top surface of the piston 14. The combustion chamber 18 has the shape of a pent roof sloping in a manner of causing a midsection of an upper part thereof, in other words, the cylinder ceiling part as the undersurface of the cylinder head 12 to be higher. In the combustion chamber 18, the air-fuel mixture of fuel and air can burn. On the cylinder ceiling part being the upper part of the combustion chamber 18, formed are an intake port 19 and an exhaust port 20 while being opposed, and located are bottom ends of an intake valve 21 and an exhaust valve 22 respectively for the intake port 19 and the exhaust port 20. The intake valve 21 and the exhaust valve 22 are supported by the cylinder head 12 movably along an axis direction while being actuated and supported in a direction of closing the intake port 19 and the exhaust port 20 (upward in FIG. 2). Moreover, an intake camshaft 23 and an exhaust camshaft 24 are rotatably supported by the cylinder head 12, and an intake cam 25 and an exhaust cam 26 are in contact with top ends of the intake valve 21 and the exhaust valve 22.

Incidentally, although not illustrated, an endless timing chain is looped around a crankshaft sprocket fixed to the crankshaft 16 and camshaft sprockets fixed respectively to the intake camshaft 23 and the exhaust camshaft 24. Therefore, the crankshaft 16, the intake camshaft 23, and the exhaust camshaft 24 can operate together.

Consequently, if the intake camshaft 23 and the exhaust camshaft 24 rotate in synchronization with the crankshaft 16, the intake cam 25 and the exhaust cam 26 move the intake valve 21 and the exhaust valve 22 up and down at specified timings; accordingly, it is possible to open and close the intake port 19 and the exhaust port 20, and to cause the intake port 19 and the combustion chamber 18 to communicate with the combustion chamber 18 and the exhaust port 20 respectively. In this case, the intake camshaft 23 and the exhaust camshaft 24 are set to make one revolution (360 degrees) during two revolutions (720 degrees) of the crankshaft 16. Therefore, the engine 10 performs four strokes of the intake stroke, the compression stroke, the power stroke, and the exhaust stroke while the crankshaft 16 makes two revolutions, and at this time, the intake camshaft 23 and the exhaust camshaft 24 make one revolution.

Furthermore, the valve mechanisms of the engine 10 are variable valve timing-intelligent systems (VVT) 27 and 28 that control the intake valve 21 and the exhaust valve 22 at optimum open and close timings in accordance with the operating state. The variable valve timing-intelligent systems 27 and 28 as variable valve means are configured by being provided with VVT controllers 29 and 30 at shaft ends of the intake camshaft 23 and the exhaust camshaft 24, and hydraulic pressures from oil control valves 31 and 32 are caused to act on unillustrated advance and retard chambers of the VVT controllers 29 and 30; accordingly, it is possible to change the phases of the camshafts 23 and 24 in relation to the camshaft sprockets and to advance and retard the open and close timings of the intake valve 21 and the exhaust valve 22. In this case, the variable valve timing-intelligent systems 27 and 28 advance or retard the open and close timings of the intake valve 21 and the exhaust valve 22 setting the working angle (open period) thereof to be constant. Moreover, the intake camshaft 23 and the exhaust camshaft 24 are provided with cam position sensors 33 and 34 for detecting revolution phases thereof (also refer to FIG. 1).

The intake port 19 is coupled to a surge tank 36 via an intake manifold 35, an intake pipe 37 is coupled to the surge tank 36, and an air cleaner 38 is attached to an air intake of the intake pipe 37. Additionally, an electronic throttle device 40 as load adjusting means, which has a throttle valve 39, is provided on the downstream side of the air flow direction of the air cleaner 38. Moreover, the cylinder head 12 is equipped with the fuel injection valve 41 as fuel injection means for injecting fuel directly into the combustion chamber 18. The fuel injection valve 41 is located on the intake port 19 side and is placed with the inclination of a specified angle in upward and downward directions. The fuel injection valve 41 can inject fuel toward a top face of the piston 14 in a manner where fuel goes with an intake flow generated in the combustion chamber 18. The fuel injection valve 41 installed on each cylinder is coupled to a delivery pipe 42, and a high-pressure fuel pump (fuel pump) 44 is coupled to the delivery pipe 42 via a high-pressure supply pipe 43. Furthermore, the cylinder head 12 is equipped with a spark plug 45 that is located on the upper part of the combustion chamber 18 and ignites air-fuel mixture.

On the other hand, the exhaust port 20 is coupled to an exhaust pipe 47 via an exhaust manifold 46, and the exhaust pipe 47 is equipped with three-way catalysts 48 and 49 for cleaning hazardous substances, such as HC, CO, and NOx, included in exhaust gases. Moreover, the engine 10 is provided with a starter motor 50 for cranking, and after an unillustrated pinion gear engages a ring gear at the start of the engine, the torque is transferred from the pinion gear to the ring gear, and the starter motor 50 can rotate the crankshaft 16.

Incidentally, as illustrated in FIGS. 1 and 2, the vehicle 1 is equipped with an electronic control unit (ECU) 51 that is configured with a microcomputer as the center and is capable of controlling each unit of the engine 10. The ECU 51 is electrically connected to each unit of the vehicle 1 such as the engine 10, the transmission 3, and the brake actuator 8e of the braking device 8, and can control each unit of the vehicle 1. The ECU 51 can control a fuel injection timing of the fuel injection valve 41, an ignition timing of the spark plug 45, a throttle opening of the electronic throttle device 40 (assuming that the throttle opening is 100% when the throttle valve 39 is fully open), and the like, and determines the amount of fuel injection, an injection timing, an ignition timing, the throttle opening, and the like based on the operating state of the engine, such as the detected intake air amount, intake temperature, intake pressure (intake pipe negative pressure), throttle opening, accelerator opening, engine revolutions, and engine coolant temperature.

In other words, an air flow sensor 52 and an intake temperature sensor 53 are installed on an upstream side of an air flow direction of the intake pipe 37, and the surge tank 36 is provided with an intake pressure sensor 54. The measured intake air amount, intake temperature, and intake pressure (intake pipe negative pressure) are output to the ECU 51.

Furthermore, a throttle opening sensor 55 is installed on the electronic throttle device 40, and outputs the present throttle opening to the ECU 51. Here, the ECU 51 can calculate an engine load (load factor) as an internal combustion engine load based on the detected throttle opening and intake air amount.

The accelerator pedal 10*a* is provided with an accelerator opening sensor 56, and the accelerator opening sensor 56 outputs the present accelerator opening (assuming that the accelerator opening is 100% when the accelerator is fully open). Incidentally, the accelerator opening sensor 56 is for detecting an accelerator opening in accordance with the stepping of the accelerator pedal 10*a* of the vehicle 1 on which the engine 10 is mounted, as a parameter for judging the presence or absence of a driver's request to the vehicle 1 for acceleration and the amount of acceleration that a driver requests from the vehicle 1. In other words, the accelerator opening detected by the accelerator opening sensor 56 is equivalent to the operation amount of a driver's acceleration request operation on the vehicle 1. Furthermore, the accelerator opening detected by the accelerator opening sensor 56 is equivalent to the operation amount of the driving force request operation in accordance with a driver's acceleration request to the vehicle 1. In other words, the accelerator opening detected by the accelerator opening sensor 56 is equivalent to a value in accordance with request driving force that a driver requests from the vehicle 1.

Moreover, a crank angle sensor 57 is provided for the crankshaft 16, and outputs a detected crank angle to the ECU 51. The ECU 51 distinguishes between the intake stroke, the compression stroke, the power stroke, and the exhaust stroke in each cylinder based on the crank angle while calculating engine revolutions. Incidentally, here, to put it another way, the engine revolutions correspond to the revolution speed of the crankshaft 16. If the revolution speed of the crankshaft 16 increases, the revolutions of the crankshaft 16, that is, the engine revolutions of the engine 10 increase, too.

Furthermore, a coolant temperature sensor 58 for detecting the temperature of engine coolant is provided for the cylinder block 11, and outputs the detected temperature of engine coolant to the ECU 51. Moreover, a fuel pressure sensor 59 for detecting fuel pressure is provided for the delivery pipe 42 communicating with each fuel injection valve 41, and outputs the detected fuel pressure to the ECU 51.

On the other hand, the exhaust pipe 47 is provided with an A/F sensor 60 for detecting an air/fuel ratio of the engine 10 on an upstream side of an exhaust gas flow direction of the three-way catalyst 48, and an oxygen sensor 61 on a downstream side of the exhaust gas flow direction. The A/F sensor 60 detects the exhaust gas air/fuel ratio of the exhaust gas before introduced into the three-way catalyst 48, and outputs the detected air/fuel ratio to the ECU 51. The oxygen sensor 61 detects the concentration of oxygen in the exhaust gas after discharged from the three-way catalyst 48, and outputs the detected concentration of oxygen to the ECU 51. The air/fuel ratio (estimated air/fuel ratio) detected by the A/F sensor is used for controlling the feedback of the air/fuel ratio (theoretical air/fuel ratio) of air-fuel mixture including intake air and fuel. In other words, the A/F sensor 60 detects an exhaust air/fuel ratio over an entire area from a rich to a lean region based on the concentration of oxygen and the concentration of unburned gas in the exhaust gas, and feeds it back to the ECU 51; accordingly, it is possible to correct the amount of fuel injection and control combustion in an optimum combustion state suited to the operating state.

Moreover, a wheel speed sensor 62 is provided in the vicinity of each of the wheels 7F and 7R of the vehicle 1, and outputs to the ECU 51 the detected revolution speed of each of the wheels 7F and 7R. The ECU 51 can calculate the vehicle speed of the vehicle 1 based on the revolution speed of each of the wheels 7F and 7R detected by each of the wheel speed sensors 62. Incidentally, the ECU 51 may calculate the vehicle speed of the vehicle 1 not based on the detection result of the wheel speed sensor 62 but based on a detection result by an output revolution sensor 65 to be described later, for example.

Furthermore, the brake pedal 8*a* is provided with a brake pedal sensor 63. The brake pedal sensor 63 outputs to the ECU 51 on/off of the detected brake operation, a pedal stroke, and pedal pressure. Incidentally, the brake pedal sensor 63 is for detecting a driver's operation of the brake pedal 8*a*, that is, the brake operation.

Additionally, an input revolution sensor 64 is provided for an input side (an engine 10 side) of the transmission 3, and outputs to the ECU 51 the detected input revolutions (input revolution speed) of the transmission 3. The output revolution sensor 65 is provided on an output side (a wheel (rear wheel) 7R side) of the transmission 3, and outputs to the ECU 51 the detected output revolutions (output revolution speed) of the transmission 3. Incidentally, the input revolution sensor 64 and the output revolution sensor 65 may perform detection based on the revolutions of members rotating at the revolutions (revolution speeds) in proportion to the revolutions (revolution speeds) of a revolution member on the input side (for example, an input disk in a case of a toroidal continuously variable transmission and a primary pulley in a case of a belt continuously variable transmission), and a revolution member on the output side (for example, an output disk in a case of a toroidal continuously variable transmission and a secondary pulley in a case of a belt continuously variable transmission), respectively. Furthermore, the input revolutions of the transmission 3 basically correspond to the engine revolutions being the output revolutions of the engine 10.

Hence, the ECU 51 drives the high-pressure fuel pump 44 based on the detected fuel pressure in a manner of bringing the fuel pressure to a specified pressure as well as determines the amount of fuel injection (fuel injection period), an injection timing, an ignition timing and the like based on the engine operation state such as the detected intake air amount, intake temperature, intake pressure, throttle opening, accelerator opening, engine revolutions, and engine coolant temperature, and executes fuel injection and ignition by driving the fuel injection valve 41 and the spark plug 45. Moreover, the ECU 51 feeds back the concentration of oxygen in the detected exhaust gas and corrects the amount of fuel injection in a manner of adjusting the air/fuel ratio to the stoichiometry ratio (theoretical air/fuel ratio).

Furthermore, the ECU 51 can control the variable valve timing-intelligent systems 27 and 28 based on the engine operation state. In other words, the overlap of a close timing of the exhaust valve 22 and an open timing of the intake valve 21 is eliminated at low temperature, engine startup, idle running, and low load; accordingly, it is made it possible to reduce the blowback amount of exhaust gas to any one of the intake port 19 and the combustion chamber 18, stabilize combustion, and improve fuel economy. Moreover, at middle load, increasing the overlap makes it possible to increase the internal FGR rate and improve the exhaust gas cleaning efficiency as well as reduce pumping losses and improve the fuel economy.

Furthermore, at high load and low to middle revolution, the blowback amount of intake air to the intake port 19 is reduced by advancing the close timing of the intake valve 21; accordingly, the volumetric efficiency is improved. Additionally, at high load and high revolution, the timing is adjusted to the inertia force of intake air by retarding the close timing of the intake valve 21 adjusting to the number of revolutions; accordingly, the volumetric efficiency is improved.

In the engine 10 configured as above, air is sucked in the combustion chamber 18 via the intake port 19 by the piston 14 descending in the cylinder bore 13 (intake stroke), and air is compressed by the piston 14 ascending in the cylinder bore 13 via bottom dead center in the intake stroke (compression stroke). At this time, fuel is injected from the fuel injection valve 41 into the combustion chamber 18 in any one of the intake stroke and the compression stroke, and air-fuel mixture is formed by mixing fuel and air. The air-fuel mixture is then ignited by the spark plug 45 when the piston 14 reaches around top dead center in the compression stroke, the air/fuel mixture burns, and the piston 14 is caused by the combustion pressure to descend (power stroke). The air-fuel mixture after combustion is released via the exhaust port 20 as exhaust gas by the piston 14 ascending again toward top dead center in the intake stroke via bottom dead center in the power stroke (exhaust stroke). The reciprocating motion of the piston 14 in the cylinder bore 13 is transferred to the crankshaft 16 via the connecting rod 17, is converted into a rotary motion here, and is taken out as output. At the same time, the crankshaft 16 is further rotated by inertia force with a counterweight; accordingly, the piston 14 reciprocates in the cylinder bore 13 following the revolution of the crankshaft 16. The crankshaft 16 makes two revolutions so that the piston 14 reciprocates in the cylinder bore 13 twice, during which the piston 14 makes a series of four strokes made up of the intake stroke, the compression stroke, the power stroke and the exhaust stroke to produce an explosion in the combustion chamber 18.

Here, the ECU 51 also used as the driving force control device 100 of the embodiment is for controlling the driving force of the vehicle 1 by combining the engine 10 and the transmission 3, and can control the operation of the engine 10 as well as the transmission ratio (or shift position) of the transmission 3. The driving force control device 100 performs cooperative control over the engine 10 and the transmission 3 based on the accelerator opening (accelerator operation amount) equivalent to the operation amount of a driver's driving force request operation (acceleration request operation) on the vehicle 1, and controls engine torque as engine torque generated by the engine 10 and engine revolutions as an engine revolution speed to control the driving force of the vehicle 1. Incidentally, the accelerator opening detected by the accelerator opening sensor 56 is equivalent to a value in accordance with request driving force that a driver requests from the vehicle 1, as described above.

Additionally, the driving force control device 100 of the embodiment executes revolution fluctuation suppression shift control (revolution fluctuation suppression control) that suppresses fluctuations in engine revolutions under a specified condition, and accordingly encourages to improve the efficiency of the whole driving system of the vehicle 1. In other words, the driving force control device 100 of the embodiment executes the revolution fluctuation suppression shift control that suppresses fluctuations in engine revolutions in a case where the operating point of the engine 10 in accordance with engine torque and engine revolutions is within an optimum fuel economy range being a region set with a specified hysteresis width relative to an optimum fuel economy line of the engine 10, and accordingly encourages to improve the efficiency of the whole driving system of the vehicle 1.

Specifically, as illustrated in FIGS. 1 and 3, the ECU 51 also used as the driving force control device 100 according to the embodiment functionally and conceptually includes a target control amount calculating unit 110 as target control amount calculation means, an engine control unit 120 as engine control means, and a transmission control unit 130 as shift control means.

Here, the ECU 51 also used as the driving force control device 100 according to the embodiment is configured with a microcomputer as the center, has a processing unit 51a, a storage unit 51b and an input/output unit 51c. They are connected to each other and can pass signals between them. The input/output unit 51c is connected to an unillustrated driving circuit for driving each unit of the vehicle 1 including the engine 10 and the transmission 3, and each type of the above-mentioned sensors. The input/output unit 51c inputs and outputs signals between the sensors and the like. Furthermore, the storage unit 51b stores a computer program for controlling each unit of the vehicle 1 including the engine 10 and the transmission 3. The storage unit 51b can be configured by any one of nonvolatile memory (read-only storage medium such as a CD-ROM) such as a hard-disk device, a magneto-optical disk device and flash memory, volatile memory such as RAM (Random Access Memory), and a combination thereof. The processing unit 51a is configured by unillustrated memory and CPU (Central Processing Unit), and has at least the above-mentioned target control amount calculating unit 110, engine control unit 120, and transmission control unit 130. With regard to each type of controls by the driving force control device 100, based on a detection result by the sensor provided for each unit, the processing unit 51a reads the computer program into memory installed in the processing unit 51a to compute, and transmits a control signal in accordance with the computing result to execute the computer program. At this time, the processing unit 51a stores a numeric value halfway through computing in the storage unit 51b as appropriate, and retrieves the stored numeric value to compute. Incidentally, in a case of controlling each unit of the vehicle 1 including the engine 10, special hardware different from the ECU 51 may be used for control instead of the computer program.

Additionally, the target control amount calculating unit 110 is for calculating an internal combustion engine target control amount of the engine 10 and a transmission target control amount of the transmission 3, based on the accelerator opening (accelerator operation amount) detected by the accelerator opening sensor 56. The internal combustion engine target control amount calculated by the target control amount calculating unit 110 is the control amount targeted to control the output of the engine 10. The transmission target control amount calculated by the target control amount calculating unit 110 is the control amount targeted to control the shifting of the transmission 3.

The engine control unit 120 is for controlling the operation of the engine 10 based on the internal combustion engine target control amount and controlling the output of the engine 10. Basically, based on the internal combustion engine target control amount, the engine control unit 120 controls a fuel injection timing of the fuel injection valve 41, an ignition timing of the spark plug 45, and a throttle opening of the electronic throttle device 40 of the engine 10 to control the output of the engine 10.

The transmission control unit 130 is for controlling the shifting of the transmission 3 based on the transmission target control amount. Basically, based on the transmission target control amount, the transmission control unit 130 controls each unit of the transmission 3, and controls the transmission ratio (shift position in a case where the transmission 3 is an automatic transmission) being the ratio of an input revolution speed input to the transmission 3 to an output revolution speed output from the transmission 3.

The target control amount calculating unit 110 of the embodiment calculates a target throttle opening being a throttle opening targeted as the internal combustion engine target control amount, and calculates target engine revolutions being engine revolutions targeted as the transmission target control amount.

Additionally, the target control amount calculating unit 110 calculates the target engine revolutions assuming that there is no change in the accelerator opening detected by the accelerator opening sensor 56 in a case where the operating point of the engine 10 is within an optimum fuel economy range. Based on the target engine revolutions, the transmission control unit 130 then controls the transmission ratio of the transmission 3 in a manner of bringing actual engine revolutions to the target engine revolutions to control the shifting, and accordingly executes the revolution fluctuation suppression shift control that suppresses fluctuations in engine revolutions in a case where the operating point of the engine 10 is within an optimum fuel economy range.

Incidentally, as described above, engine revolutions being the output revolutions of the engine 10 basically correspond to the input revolutions of the transmission 3. Therefore, the target control amount calculating unit 110 calculates target input revolutions being a target of the input revolutions as the transmission target control amount instead of the target engine revolutions. The transmission control unit 130 may control the transmission ratio of the transmission 3 by use of the target input revolutions. In other words, the transmission control unit 130 may control the transmission ratio of the transmission 3 in a manner of bringing actual input revolutions detected by the input revolution sensor 64 to the target input revolutions to control the shifting, for example.

Specifically, as illustrated in FIG. 3, the target control amount calculating unit 110 of the embodiment is configured by including a target throttle opening calculating unit 111, an operating point judging unit 112, a mediating unit 113, a target engine revolution calculating unit 114.

The target throttle opening calculating unit 111 is for calculating a target throttle opening as the internal combustion engine target control amount. The target throttle opening calculating unit 111 calculates a target throttle opening tatgt based on an accelerator opening (an accelerator operation amount) equivalent to the operation amount of a driver's driving force request operation (acceleration request operation) on the vehicle 1 and equivalent to a request driving amount that a driver requests from the vehicle 1. Furthermore, specifically, an accelerator opening pa is input by the accelerator opening sensor 56 in accordance with a detection signal, a vehicle speed spd of the vehicle 1 is input by the wheel speed sensor 62 in accordance with a detection signal, and the target throttle opening calculating unit 111 calculates the target throttle opening tatgt based on the present accelerator opening pa and the present vehicle speed spd. The target throttle opening tatgt is a throttle opening corresponding to target driving force of the vehicle 1 for realizing request driving force that a driver requests from the vehicle 1.

The target throttle opening calculating unit 111 obtains the target throttle opening tatgt based on a throttle opening map m01 illustrated in FIG. 4, for example. In the throttle opening map m01, the horizontal axis indicates the accelerator opening pa, and the vertical axis the throttle opening ta. The throttle opening map m01 describes the relationship between the accelerator opening pa and the throttle opening ta at each vehicle speed spd. In the throttle opening map m01, the throttle opening ta increases with an increase in the accelerator opening pa, and decreases with an increase in the vehicle speed spd. The relationship between the vehicle speed spd, the accelerator opening pa and the throttle opening ta is preset in the throttle opening map m01 that is stored in the storage unit 51*b*. The target throttle opening calculating unit 111 obtains the target throttle opening tatgt according to the accelerator opening pa and the vehicle speed spd based on the throttle opening map m01. The target throttle opening calculating unit 111 outputs the calculated target throttle opening tatgt to the engine control unit 120.

Incidentally, in the embodiment, the target throttle opening calculating unit 111 obtains the target throttle opening tatgt by use of the throttle opening map m01; however, the embodiment is not limited to this. The target throttle opening calculating unit 111 may obtain the target throttle opening tatgt based on a mathematical expression equivalent to the throttle opening map m01, for example. The same is applied to various maps to be described below.

The engine control unit 120 then controls the output of the engine 10 based on the target throttle opening tatgt calculated by the target throttle opening calculating unit 111 constituting the target control amount calculating unit 110. The engine control unit 120 controls the drive of the electronic throttle device 40 of the engine 10 in a manner of bringing the present actual throttle opening detected by the throttle opening sensor 55 to the target throttle opening tatgt input from the target throttle opening calculating unit 111, in other words, in a manner where the present actual throttle opening ta converges on the target throttle opening tatgt, and controls the output (engine torque and engine revolutions) retrieved from the engine 10.

The operating point judging unit 112 is for judging the state of the operating point of the engine 10. The operating point of the engine 10 is determined in accordance with engine torque and engine revolutions. The operating point judging unit 112 of the embodiment is for judging whether the present operating point of the engine 10 in accordance with the present engine torque and the present engine revolutions is within the optimum fuel economy range.

Here, FIG. 5 is a view illustrating the operation characteristics of the engine 10 controlled by the driving force control device 100. The horizontal axis indicates the engine revolutions ne, the vertical axis the engine torque te. In FIG. 5, the solid line indicates the optimum fuel economy line L, the dotted lines the fuel economy contour lines E1, E2 and E3, the chain lines the output contour lines P1, P2, P3 and P4, and the different double dash lines the upper limit of the optimum fuel economy range Lmax and the lower limit of the optimum fuel economy range Lmin of the optimum fuel economy range X.

The optimum fuel economy line L is a set of operating points of the engine 10 that can operate the engine 10 at optimum fuel economy (efficiently). In other words, the optimum fuel economy line L indicates the relationship between the engine torque te and the engine revolutions ne that can operate the engine 10 at the best fuel economy, that is, at the highest engine efficiency. The fuel economy here indicates the amount of fuel consumption per unit workload, and is equivalent to the volume of fuel necessary for the vehicle 1 to run a unit distance, or the distance that the vehicle 1 can run on the unit volume of fuel. In short, the optimum fuel economy line L is set based on the engine revolutions ne and the engine torque te, which can operate the engine 10 giving a high priority to the distance that the vehicle 1 equipped with the engine 10 can run on the unit volume of fuel, and is determined in accordance with the output characteristics of the engine 10.

Additionally, the optimum fuel economy range X set with reference to the optimum fuel economy line L is a region set with a specified hysteresis width α relative to the optimum fuel economy line L, where the upper limit Lmax is an upper limit of the optimum fuel economy range X, and the lower limit Lmin is a lower limit of the optimum fuel economy range X. The optimum fuel economy range X is set as a region where a decrease in distance to travel, that is, a decrease in fuel economy relative to the optimum fuel economy line L falls within a specified range in accordance with the specified hysteresis width α. It is sufficient if the specified hysteresis width α is set as appropriate in accordance with a range that, considering, for example, the suppression of a driver's uncomfortable feeling during operation and the suppression of a decrease in fuel economy, they are compatible with each other. In the optimum fuel economy range X of the embodiment, the specified hysteresis width α relative to the optimum fuel economy line L is preset and for example is set as a region where a decrease in fuel economy relative to the optimum fuel economy line L is within 5%. Incidentally, in other embodiments to be described later, the specified hysteresis width α, to put it another way, the optimum fuel economy range X is made variable in accordance with the state of the vehicle 1.

Incidentally, the fuel economy contour lines E1, E2 and E3 are the operating points of the engine 10 that the fuel economy (the efficiency of the engine 10) is equal. In a case where the operating points of the engine 10, that is, the combination of engine torque and engine revolutions are on the same fuel economy contour lines E1, E2 and E3, the fuel economy of the engine 10 is equal. The output contour lines P1, P2, P3 and P4 are a set of the operating points of the engine 10 that the output (power) of the engine 10 is equal. In a case where operating points of the engine 10, that is, the combination of engine torque and engine revolutions, are on the same output contour lines P1, P2, P3 and P4, the output (power) of the engine 10 is equal.

The engine 10 then inputs the present engine torque te and the present engine revolutions ne into the operating point judging unit 112. The operating point judging unit 112 acquires the present engine revolutions ne in accordance with a detection signal input from the crank angle sensor 57. Moreover, the operating point judging unit 112 acquires the present engine torque te in accordance with detection signals input from various sensors mounted on the engine 10. The operating point judging unit 112 can acquire the present engine torque te by various publicly known methods based on the engine revolutions ne and an air intake amount (a fuel injection amount in a case of a diesel engine), for example.

The operating point judging unit 112 judges whether the present operating point of the engine 10 in accordance with the input present engine torque te and engine revolutions ne is within the optimum fuel economy range X. The operating point judging unit 112 outputs to the mediating unit 113 the judgment result showing whether the present operating point of the engine 10 is within the optimum fuel economy range X.

The mediating unit 113 is for mediating an accelerator opening for calculation pap being an accelerator opening pa for calculation. The accelerator opening for calculation pap to be mediated by the mediating unit 113 is the accelerator opening applied when the target engine revolution calculating unit 114 to be described later calculates target engine revolutions netgt. In other words, the target engine revolution calculating unit 114 to be described later calculates the target engine revolutions netgt based on the accelerator opening for calculation pap.

In a case where the present operating point of the engine 10 in accordance with the present engine torque te and the present engine revolutions ne is out of the optimum fuel economy range X, for example, in a case where the present operating point of the engine 10 is an operating point A of FIG. 5, the mediating unit 113 sets the present accelerator opening pa in accordance with a detection signal input from the accelerator opening sensor 56 to the accelerator opening for calculation pap, and outputs to the target engine revolution calculating unit 114.

On the other hand, in a case where the present operating point of the engine 10 in accordance with the present engine torque te and the present engine revolutions ne is within the optimum fuel economy range X, for example, in a case where the present operating point of the engine 10 is an operating point B of FIG. 5, the mediating unit 113 sets the accelerator opening for calculation pap without the present accelerator opening pa in accordance with a detection signal input from the accelerator opening sensor 56, assuming that there is no change in the accelerator opening pa, and outputs to the target engine revolution calculating unit 114. The mediating unit 113, for example, keeps the accelerator opening for calculation pap constant, and accordingly sets the accelerator opening for calculation pap assuming that there is no change in the accelerator opening pa. Furthermore, the mediating unit 113 sets, for example, an accelerator opening for calculation pap in a previous control cycle (previous value) stored in the storage unit 51b to an accelerator opening for calculation pap in the present control cycle, and accordingly sets the accelerator opening for calculation pap assuming that there is no change in the accelerator opening pa, and outputs the accelerator opening for calculation pap to the target engine revolution calculating unit 114.

The target engine revolution calculating unit 114 is for calculating target engine revolutions as the transmission target control amount. The target engine revolution calculating unit 114 calculates the target engine revolutions netgt based on the accelerator opening (accelerator operation amount) equivalent to the operation amount of a driver's driving force request operation (acceleration request operation) on the vehicle 1 and equivalent to a request driving amount that a driver requests from the vehicle 1. More specifically, the mediating unit 113 and the wheel speed sensor 62 input the accelerator opening for calculation pap mediated in accordance with the judgment result of the present operating point of the engine 10 and the vehicle speed spd of the vehicle 1 in accordance with a detection signal, respectively, into the target engine revolution calculating unit 114. The target engine revolution calculating unit 114 calculates the target engine revolutions netgt based on the accelerator opening for calculation pap and the vehicle speed spd.

The target engine revolution calculating unit 114 obtains the target engine revolutions netgt based on an engine revolution map m02 illustrated in FIG. 6, for example. In the engine revolution map m02, the horizontal axis indicates the vehicle speed spd, and the vertical axis the engine revolutions ne. The engine revolution map m02 describes the relationship between the vehicle speed spd and the engine revolutions ne at each accelerator opening pa. In the engine revolution map m02, the engine revolutions ne increases with an increase in the accelerator opening pa, and increases with an increase in the vehicle speed spd. The relationship between the vehicle speed spd, the accelerator opening pa, and the engine revolutions ne are preset in the engine revolution map m02 that is stored in the storage unit 51b. The target engine revolution calculating unit 114 obtains the target engine revolutions netgt according to the accelerator opening for calculation pap and the vehicle speed spd based on the engine revolution map m02. The target engine revolution calculating unit 114 outputs the calculated target engine revolutions netgt to the transmission control unit 130.

The transmission control unit 130 then controls the shifting of the transmission 3 based on the target engine revolutions netgt calculated by the target engine revolution calculating unit 114 constituting the target control amount calculating unit 110. The transmission control unit 130 controls the transmission ratio (shift position in a case where the transmission 3 is an automatic transmission) of the transmission 3 in a manner of bringing the present actual engine revolutions detected by the crank angle sensor 57 to the target engine revolutions netgt input from the target engine revolution calculating unit 114, in other words, in a manner where the present actual engine revolutions ne converge on the target engine revolutions netgt.

In short, in a case where the operating point of the engine 10 is out of the optimum fuel economy range, the target control amount calculating unit 110 calculates both of the target throttle opening tatgt being the internal combustion engine target control amount and the target engine revolutions netgt being the transmission target control amount based on the present actual accelerator opening pa. In contrast, in a case where the operating point of the engine 10 is within the optimum fuel economy range, the target control amount calculating unit 110 calculates the target throttle opening tatgt being the internal combustion engine target control amount based on the present actual accelerator opening pa while calculating the target engine revolutions netgt being the transmission target control amount based on not the present actual accelerator opening pa but accelerator opening pa used in a previous control cycle.

In the driving force control device 100 configured as above, if the operating point judging unit 112 judges that the present operating point of the engine 10 is out of the optimum fuel economy range, the mediating unit 113 sets the present actual accelerator opening pa as the accelerator opening for calculation pap, and the target engine revolution calculating unit 114 calculates the target engine revolutions netgt based on the accelerator opening for calculation pap being the present actual accelerator opening pa. As a result, in a case where the present operating point of the engine 10 is out of the optimum fuel economy range, the transmission control unit 130 controls the transmission ratio of the transmission 3 in a manner of bringing actual engine revolutions ne to the target engine revolutions netgt based on the target engine revolutions netgt that fluctuates in accordance with the present actual accelerator opening pa to control the shifting; accordingly, the driving force control device 100 can execute normal shift control.

On the other hand, in the driving force control device 100, if the operating point judging unit 112 judges that the present operating point of the engine 10 is within the optimum fuel economy range, the mediating unit 113 sets the previous value as the accelerator opening for calculation pap, and the target engine revolution calculating unit 114 calculates the target engine revolutions netgt based on the accelerator opening for calculation pap of the previous value; accordingly, in a case where the operating point of the engine 10 is within the optimum fuel economy range, the target control amount calculating unit 110 can calculate the target engine revolutions netgt assuming that there is no change in the accelerator opening, to put it another way, can keep the target engine revolutions netgt approximately constant. In short, in a case where the present operating point of the engine 10 is within the optimum fuel economy range, the driving force control device 100 can calculate the target engine revolutions, assuming that there is no change in the accelerator opening detected by the accelerator opening sensor 56.

As a result, in a case where the present operating point of the engine 10 is within the optimum fuel economy range, the transmission control unit 130 controls the transmission ratio of the transmission 3 in a manner of bringing actual engine revolutions ne to the target engine revolutions netgt based on the target engine revolutions netgt kept approximately constant to control the shifting; accordingly, in a case where the operating point of the engine 10 is within the optimum fuel economy range, the driving force control device 100 can execute the revolution fluctuation suppression shift control that suppresses fluctuations in the actual engine revolutions by keeping the actual engine revolutions approximately constant.

Therefore, in a case where the present operating point of the engine 10 is within the optimum fuel economy range, the driving force control device 100 executes the revolution fluctuation suppression shift control that suppresses fluctuations in engine revolutions, and accordingly can suppress unnecessary shifting and suppress fluctuations in the revolutions of the engine 10 in a case where the present operating point of the engine 10 is within the optimum fuel economy range. In a case where the present operating point of the engine 10 is within the optimum fuel economy range, the driving force control device 100 can suppress the unnecessary fluctuations in the revolutions of the engine 10, and accordingly can suppress the deterioration of the engine efficiency of the engine 10 due to the deviation of the operating point from the optimum fuel economy line, in other words, a power loss equal to inertia (rotational inertia) torque incident to a fluctuation in the revolutions of the engine 10, to put it another way, a fluctuation in the revolutions of the input shaft to the transmission 3 within a range where fuel economy is not deteriorated excessively, and can suppress the amount of fuel consumption equal to inertia torque.

As a result, in a case where the present operating point of the engine 10 is within the optimum fuel economy range, the driving force control device 100 can suppress a loss equal to inertia torque incident to a fluctuation in the revolutions of the engine 10 where the engine efficiency (fuel economy) of the engine 10 is not deteriorated too much; accordingly, it is possible to improve the efficiency of the whole driving system of the vehicle 1, that is, the fuel economy further compared with a case of controlling the transmission ratio at a preset operating point on a shift line and controlling the engine revolutions, for example. To put it another way, as a case where it is better to suppress a loss equal to inertia torque in order to improve the efficiency of the whole driving system of the vehicle 1 even if the engine efficiency of the engine 10 deteriorates to some degree, in a case where the present operating point of the engine 10 is within the optimum fuel economy range, the driving force control device 100 suppresses a loss equal to inertia torque incident to a fluctuation in the revolutions of the engine 10, and consequently it is possible to improve the efficiency of the whole driving system of the vehicle 1. In short, in a case where the operating point of the engine 10 is within the optimum fuel economy range, the driving force control device 100 executes the revolution fluctuation suppression shift control that suppresses fluctuations in engine revolutions and accordingly can suppress the deterioration of the engine efficiency while suppressing the loss of inertia (rotational inertia) incident to a fluctuation in the revolutions of the engine 10. In other words, the driving force control device 100 can cope with both the suppression of the deterioration of engine efficiency and the suppression of the loss of inertia incident to a fluctuation in the revolutions of the engine 10, and can improve the efficiency of the whole driving system of the vehicle 1.

Additionally, for example, in a case of avoiding a busy shift and suppressing the deterioration of driving feeling by setting the specified hysteresis width relative to an accelerator opening, keeping the accelerator opening such that there is no change in the accelerator opening within this range, reflecting it on the calculation of the target engine revolutions (or target transmission ratio), and keeping the target engine revolutions, the engine 10 may consequently be operated at an operating point in an operation region with poor engine efficiency. For example, if an accelerator opening is decreased, and the decreased accelerator opening falls within the specified hysteresis width relative to the above accelerator opening, the throttle opening being a control amount for controlling engine torque decreases with a decrease in the accelerator opening while the (target) engine revolutions are kept approximately constant regardless of the decrease in the accelerator opening. Here, a general engine has relatively good engine efficiency in a low revolution and high load region while having a tendency that the engine efficiency in a high revolution and low load region is relatively poor. Therefore, as described above, for the decrease in the accelerator opening, the throttle opening decreases and the operating point of the engine moves to a low load region side while the engine revolutions are kept approximately constant, and the operating point of the engine is held on a high revolution side; consequently, the engine may be operated at an operating point in a high revolution and low load region with poor engine efficiency.

In contrast, the driving force control device 100 of the embodiment does not set a hysteresis width for an accelerator opening (or throttle opening, or the like) itself, but sets a specified hysteresis width where the amount of the deterioration of engine efficiency falls within a specified range with reference to the optimum fuel economy line, sets this region to be the optimum fuel economy range, and executes the revolution fluctuation suppression shift control that suppresses fluctuations in engine revolutions in a case where the operating point of the engine 10 is within the optimum fuel economy range. As a result, the driving force control device 100 of the embodiment can cope with both the suppression of the deterioration of engine efficiency and the suppression of the loss of inertia incident to a fluctuation in the revolutions of the engine 10 after preventing the engine 10 from being operated in a high revolution and low load region where engine efficiency is poor as described above, for example, and therefore can improve the efficiency of the whole driving system of the vehicle 1.

Moreover, the driving force control device 100 can suppress unnecessary fluctuations in the revolutions of the engine 10 in a case where the present operating point of the engine 10 is within the optimum fuel economy range. Hence, it is possible to suppress unnecessary shifting, in other words, suppress the frequency of shifting to suppress a busy shift, and improve drivability.

Next, with reference to the flowchart of FIG. 7 and the time chart of FIG. 8, a description will be given of the driving force control, particularly the shift control in the driving force control, of the ECU 51 also used as the driving force control device 100 according to the embodiment. Incidentally, these control routines are executed repeatedly in control cycles of several ms to several tens of ms.

Firstly, in the ECU 51 also used as the driving force control device 100, the operating point judging unit 112 judges whether the operating point of the engine 10 in accordance with engine torque and engine revolutions is within the optimum fuel economy range based on detection signals input from various sensors (S100).

In the ECU 51 also used as the driving force control device 100, if the operating point judging unit 112 judges that the operating point of the engine 10 is not within the optimum fuel economy range (S100: No), the mediating unit 113 sets the present actual accelerator opening pa as the accelerator opening for calculation pap, and the target engine revolution calculating unit 114 calculates the target engine revolutions netgt based on the accelerator opening for calculation pap being the present actual accelerator opening pa. In the driving force control device 100, the transmission control unit 130 then executes normal shift control based on the target engine revolutions netgt that fluctuate in accordance with the present actual accelerator opening pa (S102), terminates the present control cycle, and moves to the next control cycle.

On the other hand, in the ECU 51 also used as the driving force control device 100, if the operating point judging unit 112 judges that the operating point of the engine 10 is within the optimum fuel economy range (S100: Yes), the mediating unit 113 sets the previous value as the accelerator opening for calculation pap assuming that there is no change in the accelerator opening. The target engine revolution calculating unit 114 calculates the target engine revolutions netgt based on the previous value of the accelerator opening for calculation pap. In the driving force control device 100, the transmission control unit 130 executes the revolution fluctuation suppression shift control based on the target engine revolutions netgt calculated in accordance with the accelerator opening for calculation pap kept constant at the previous value (S104), terminates the present control cycle, and moves to the next control cycle.

As a result, as illustrated in FIG. 8, in the driving force control device 100, in a case where the present operating point of the engine 10 is within the optimum fuel economy range, the accelerator opening for calculation pap is kept constant relative to fluctuations in actual accelerator opening pa, for example, for the duration between a time t1 and a time t3 in the drawing, and the revolution fluctuation suppression shift control is executed; accordingly, fluctuations in the engine revolutions ne of the engine 10 are suppressed for the duration between a time t2 and the time t3 in the drawing.

According to the driving force control device 100 according to the embodiment of the present invention described above, in the driving force control device 100 for controlling engine torque generated by the engine 10 mounted on the vehicle 1 and the engine revolutions (engine revolution speed) of the engine 10 based on an accelerator opening as an operation amount of driving force request operation on the vehicle 1 to control the driving force of the vehicle 1, in a case where the operating point of the engine 10 in accordance with the engine torque and the engine revolutions is within an optimum fuel economy range being a region set with a specified hysteresis width relative to an optimum fuel economy line of the engine 10, the revolution fluctuation suppression control that suppresses fluctuations in engine revolutions is executed.

Therefore, in a case where the operating point of the engine 10 is within the optimum fuel economy range, the driving force control device 100 executes the revolution fluctuation suppression shift control that suppresses fluctuations in engine revolutions; accordingly, it is possible to suppress the deterioration of engine efficiency while suppressing the loss of inertia (rotational inertia) incident to a fluctuation in the revolutions of the engine 10, and cope with both the suppression of the deterioration of engine efficiency and the suppression of the loss of inertia incident to a fluctuation in the revolutions of the engine 10. Therefore, it is possible to improve the efficiency of the whole driving system of the vehicle 1.

Furthermore, according to the driving force control device 100 according to the embodiment of the present invention described above, included are: the target control amount calculating unit 110 for calculating the target throttle opening of the engine 10 (internal combustion engine target control amount) and the target engine revolutions of the transmission 3 (transmission target control amount) that shifts the engine revolution speed after the revolution output of the engine 10 is transferred thereto, based on the accelerator opening; the engine control unit 120 for controlling the output of the engine 10 based on the target throttle opening; and the transmission control unit 130 for controlling the shifting of the transmission 3 based on the target engine revolutions. The target control amount calculating unit 110 calculates the target engine revolutions assuming that there is no change in the accelerator opening in a case where the operating point of the engine 10 is within the optimum fuel economy range. Therefore, the target control amount calculating unit 110 calculates the target engine revolutions assuming that there is no change in the accelerator opening in a case where the operating point of the engine 10 is within the optimum fuel economy range.

Hence, the transmission control unit 130 controls the transmission ratio of the transmission 3 based on the target engine revolutions in a manner of bringing the actual engine revolutions ne to the target engine revolutions to control the shifting. Consequently, the driving force control device 100 can execute the revolution fluctuation suppression shift control that suppresses fluctuations in engine revolutions in a case where the operating point of the engine 10 is within the optimum fuel economy range, and can keep the actual engine revolutions approximately constant.

(Second Embodiment)

Figure 9:
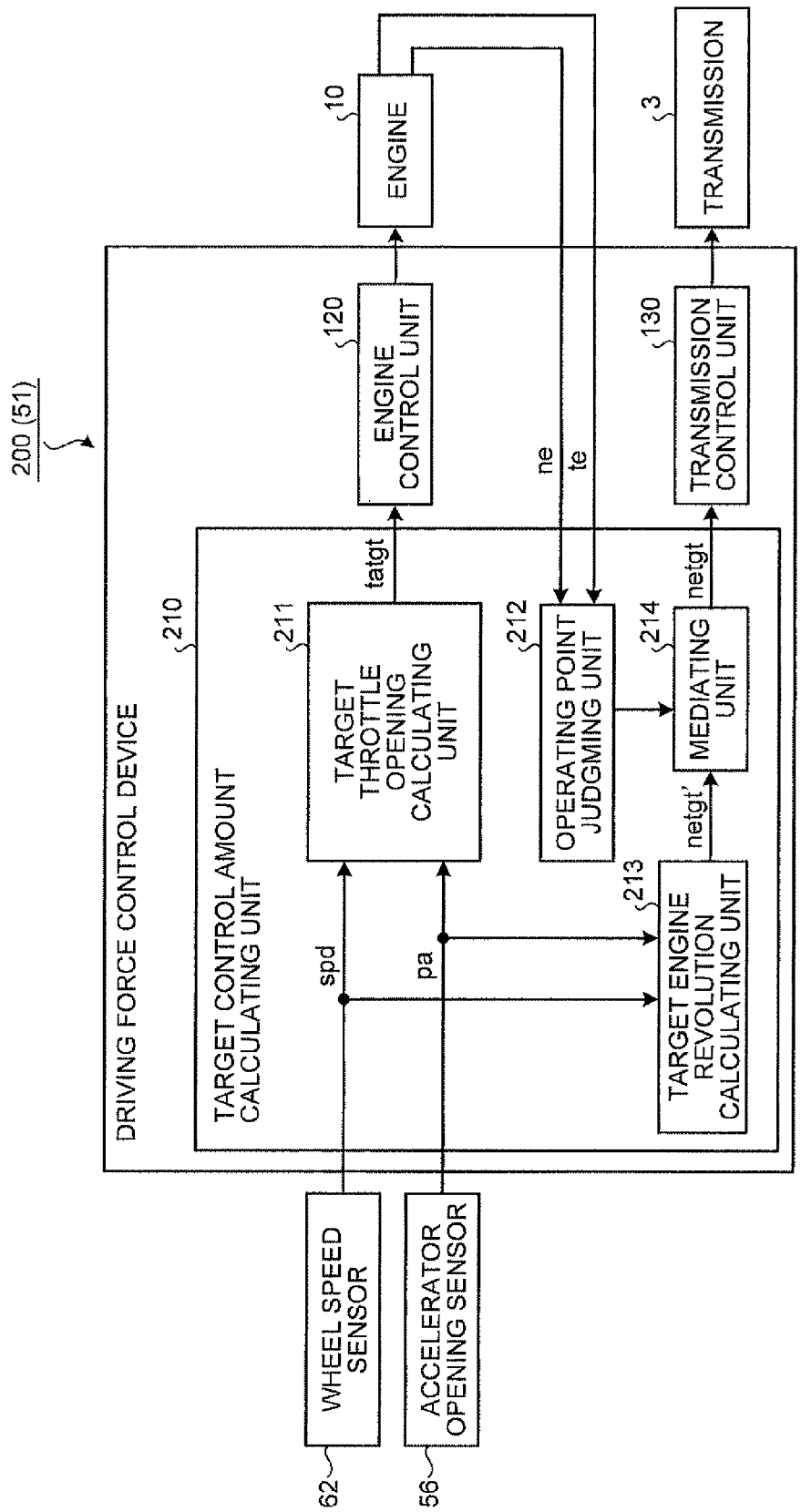
FIG. 9 is a schematic block diagram of a driving force control device according to a second embodiment of the present invention.

FIG. 9 is a schematic block diagram of a driving force control device according to a second embodiment of the present invention. The driving force control device according to the second embodiment has approximately the same configuration as that of the driving force control device according to the first embodiment; however, the configuration of target control calculation means is different from that of the driving force control device according to the first embodiment. Overlapped descriptions will be omitted of the other configurations, effects, and operations common to those of the above-mentioned embodiment as much as possible, and the same reference numerals will be attached to them.

As illustrated in FIG. 9, a driving force control device 200 of the embodiment functionally and conceptually includes a target control amount calculating unit 210 as target control amount calculation means, the engine control unit 120 as engine control means, and the transmission control unit 130 as transmission control means.

The target control amount calculating unit 210 of the embodiment is different from the above-mentioned target control amount calculating unit 110 (refer to FIG. 3) in a point of mediating target engine revolutions netgt actually used for shift control in accordance with a fact whether the operating point of the engine 10 is within the optimum fuel economy range X after calculating assumed target engine revolutions netgt' based on the present actual accelerator opening pa.

The target control amount calculating unit 210 of the embodiment calculates a target throttle opening being a throttle opening targeted as the internal combustion engine target control amount, and calculates target engine revolutions being engine revolutions targeted as the transmission target control amount.

Additionally, the target control amount calculating unit 210 of the embodiment is configured for keeping the target engine revolutions netgt itself being the transmission target control amount constant instead of keeping the accelerator opening pa for calculation constant assuming that there is no change in the accelerator opening in a case where the operating point of the engine 10 is within the optimum fuel economy range. The transmission control unit 130 controls the transmission ratio of the transmission 3 based on the target engine revolutions in a manner of bringing the actual engine revolutions to the target engine revolutions to control the shifting, and accordingly executes the revolution fluctuation suppression shift control that suppresses fluctuations in engine revolutions in a case where the operating point of the engine 10 is within the optimum fuel economy range.

Specifically, the target control amount calculating unit 210 of the embodiment is configured by including a target throttle opening calculating unit 211, an operating point judging unit 212, a target engine revolution calculating unit 213, and a mediating unit 214.

The target throttle opening calculating unit 211 calculates a target throttle opening tatgt based on the present actual accelerator opening. The engine control unit 120 then controls the output of the engine 10 based on the target throttle opening tatgt calculated by the target throttle opening calculating unit 211. The operating point judging unit 212 judges whether the present operating point of the engine 10 in accordance with the present engine torque and the present engine revolutions is within the optimum fuel economy range.

Additionally, the target engine revolution calculating unit 213 of the embodiment is for calculating assumed target engine revolutions netgt' as the transmission target control amount. The target engine revolution calculating unit 213 calculates the assumed target engine revolutions netgt' based on an accelerator opening (accelerator operation amount) equivalent to the operation amount of a driver's driving force request operation (acceleration request operation) on the vehicle 1, and equivalent to a request driving force amount that a driver requests from the vehicle 1. The target engine revolution calculating unit 213 calculates the assumed target engine revolutions netgt' based on the present actual accelerator opening pa detected by the accelerator opening sensor 56.

After the accelerator opening sensor 56 and the wheel speed sensor 62 input the present actual accelerator opening pa in accordance with a detection signal and the present actual vehicle speed spd in accordance with a detection signal, respectively, into the target engine revolution calculating unit 213, the target engine revolution calculating unit 213 calculates the assumed target engine revolutions netgt' based on the accelerator opening pa and the vehicle speed spd.

The target engine revolution calculating unit 213 obtains the assumed target engine revolutions netgt' according to the present accelerator opening pa and the present vehicle speed spd based on the engine revolution map m02 illustrated in FIG. 6, for example. The target engine revolution calculating unit 213 outputs the calculated assumed target engine revolutions netgt' to the mediating unit 214.

The mediating unit 214 is for mediating the target engine revolutions netgt actually used for shift control based on the judgment result input from the operating point judging unit 212. In a case where the present operating point of the engine 10 in accordance with the present engine torque te and the present engine revolutions ne is out of the optimum fuel economy range X, the mediating unit 214 sets the assumed target engine revolutions netgt' in accordance with the present accelerator opening pa input from the target engine revolution calculating unit 213 to an actual target engine revolutions netgt, and outputs the target engine revolutions netgt to the transmission control unit 130.

On the other hand, in a case where the present operating point of the engine 10 in accordance with the present engine torque te and the present engine revolutions ne is within the optimum fuel economy range X, the mediating unit 214 keeps the target engine revolutions netgt constant without using the assumed target engine revolutions netgt' in accordance with the present accelerator opening pa input from the target engine revolution calculating unit 213. Furthermore, the mediating unit 214 sets target engine revolutions netgt of the previous control cycle (previous value) stored in the storage unit 51b to target engine revolutions netgt of the present control cycle and accordingly keeps the target engine revolutions netgt constant to output the target engine revolutions netgt to the transmission control unit 130.

The mediating unit 113 constituting the target control amount calculating unit 210 then inputs the target engine revolutions netgt mediated in accordance with a judgment result of the present operating point of the engine 10, and the transmission control unit 130 controls the shifting of the transmission 3 based on the target engine revolutions netgt.

In short, in a case where the operating point of the engine 10 is out of the optimum fuel economy range, the target control amount calculating unit 210 calculates both the target throttle opening tatgt being the internal combustion engine target control amount and the target engine revolutions netgt being the transmission target control amount based on the present actual accelerator opening pa. In contrast, in a case where the operating point of the engine 10 is within the optimum fuel economy range, the target control amount calculating unit 210 calculates the target throttle opening tatgt being the internal combustion engine target control amount based on the present actual accelerator opening pa while calculating the target engine revolutions netgt being the transmission target control amount not based on the present actual accelerator opening pa but by using the target engine revolutions netgt used in the previous control cycle.

In the driving force control device 200 configured as above, if the operating point judging unit 212 judges that the present operating point of the engine 10 is out of the optimum fuel economy range, the mediating unit 214 sets the assumed target engine revolutions netgt' in accordance with the present actual accelerator opening pa to actual target engine revolutions netgt. As a result, in a case where the present operating point of the engine 10 is out of the optimum fuel economy range, the transmission control unit 130 controls the transmission ratio of the transmission 3 based on the target engine revolutions netgt that fluctuate in accordance with the present actual accelerator opening pa in a manner of bringing the actual engine revolutions ne to the target engine revolutions netgt to control the shifting; accordingly, the driving force control device 200 can execute normal shift control.

On the other hand, in the driving force control device 200, if the operating point judging unit 212 judges that the present operating point of the engine 10 is within the optimum fuel economy range, the mediating unit 113 sets the previous value as the target engine revolutions netgt. Therefore, in a case where the operating point of the engine 10 is within the optimum fuel economy range, the target control amount calculating unit 110 can calculate the target engine revolutions netgt kept constant at the previous value. In short, in a case where the present operating point of the engine 10 is within the optimum fuel economy range, the driving force control device 200 can keep the target engine revolutions netgt approximately constant.

As a result, in a case where the present operating point of the engine 10 is within the optimum fuel economy range, the transmission control unit 130 controls the transmission ratio of the transmission 3 based on the target engine revolutions netgt kept approximately constant in a manner of bringing the actual engine revolutions ne to the target engine revolutions netgt to control the shifting; accordingly, in a case where the operating point of the engine 10 is within the optimum fuel economy range, the driving force control device 200 can keep the actual engine revolutions approximately constant and execute the revolution fluctuation suppression shift control that suppresses fluctuations in the actual engine revolutions.

According to the driving force control device 200 according to the embodiment of the present invention described above, in a case where the operating point of the engine 10 is within the optimum fuel economy range, the driving force control device 200 executes the revolution fluctuation suppression shift control that suppresses fluctuations in engine revolutions and accordingly can suppress the deterioration of engine efficiency while suppressing the loss of inertia (rotational inertia) incident to a fluctuation in the revolutions of the engine 10. Therefore, it is possible to cope with both the suppression of the deterioration of engine efficiency and the suppression of the loss of inertia incident to a fluctuation in the revolutions of the engine 10. Hence, it is possible to improve the efficiency of the whole driving system of the vehicle 1.

Furthermore, according to the driving force control device 200 according to the embodiment of the present invention described above, included are: the target control amount calculating unit 210 for calculating a target throttle opening of the engine 10 (the internal combustion engine target control amount) and target engine revolutions of the transmission 3 (the transmission target control amount) that shifts the engine revolution speed after the revolution output of the engine 10 is transferred thereto, based on the accelerator opening; the engine control unit 120 for controlling the output of the engine 10 based on the target throttle opening; and the transmission control unit 130 for controlling the shifting of the transmission 3 based on the target engine revolutions. The target control amount calculating unit 210 keeps the target engine revolutions in a case where the operating point of the engine 10 is within the optimum fuel economy range. Therefore, the target control amount calculating unit 210 keeps the target engine revolutions approximately constant regardless of a change in the accelerator opening in a case where the operating point of the engine 10 is within the optimum fuel economy range. Hence, the transmission control unit 130 controls the transmission ratio of the transmission 3 based on the target engine revolutions in a manner of bringing the actual engine revolutions ne to the target engine revolutions to control the shifting. Consequently, in a case where the operating point of the engine 10 is within the optimum fuel economy range, the driving force control device 200 can execute the revolution fluctuation suppression shift control that suppresses fluctuations in engine revolutions and keep the actual engine revolutions approximately constant.

(Third Embodiment)

Figure 10:
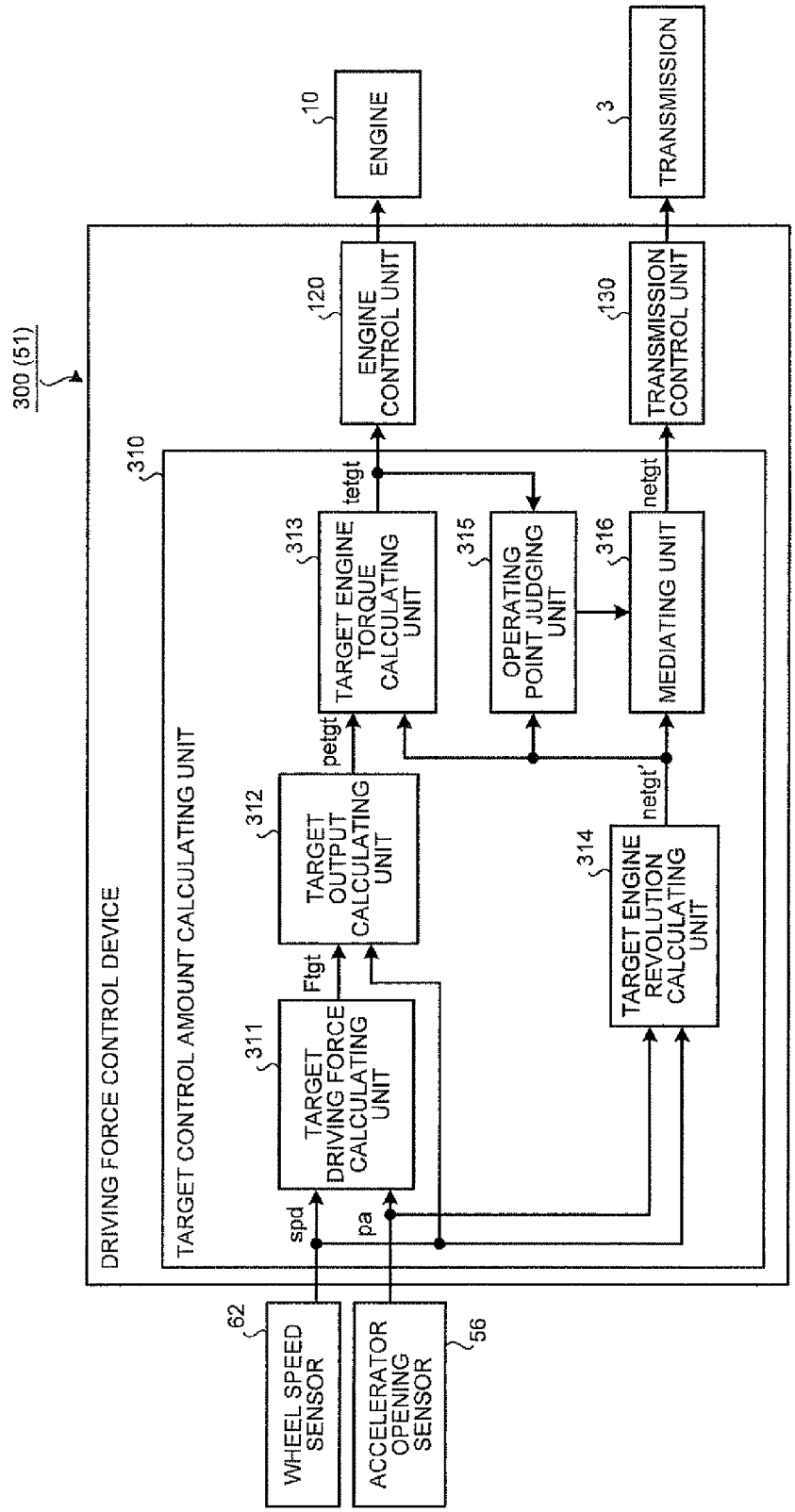
FIG. 10 is a schematic block diagram of a driving force control device according to a third embodiment of the present invention.
Figure 11:
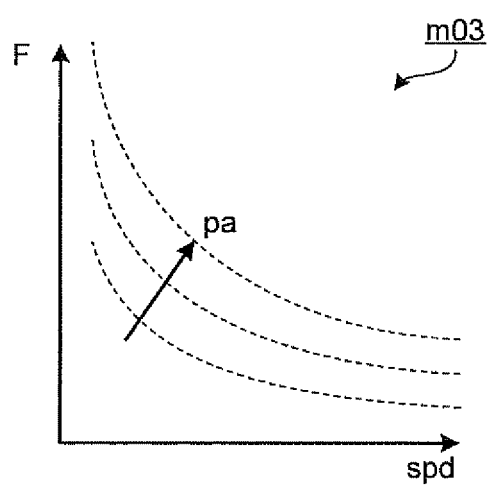
FIG. 11 is a driving force map of the driving force control device according to the third embodiment of the present invention.

FIG. 10 is a schematic block diagram of a driving force control device according to a third embodiment of the present invention. FIG. 11 is a driving force map of the driving force control device according to the third embodiment of the present invention. A driving force control device according to the third embodiment has approximately the same configuration as that of the driving force control device according to the first embodiment; however, the configuration of target control calculation means is different from that of the driving force control device according to the first embodiment. Overlapped descriptions will be omitted of the other configurations, effects, and operations common to those of the above-mentioned embodiments as much as possible, and the same reference numerals will be attached to them.

As illustrated in FIG. 10, a driving force control device 300 of the embodiment functionally and conceptually includes a target control amount calculating unit 310 as target control amount calculation means, the engine control unit 120 as engine control means, and the transmission control unit 130 as shift control means.

The target control amount calculating unit 310 of the embodiment is different from the above-mentioned target control amount calculating unit 110 (refer to FIG. 3) and target control amount calculating unit 210 (refer to FIG. 9) in a point of executing the revolution fluctuation suppression shift control in accordance with a fact whether a target operating point of the engine 10, instead of the present operating point of the engine 10, is within the optimum fuel economy range.

The target control amount calculating unit 310 of the embodiment calculates target engine torque being engine torque targeted as the internal combustion engine target control amount, and calculates target engine revolutions being engine revolutions targeted as the transmission target control amount.

Additionally, the target control amount calculating unit 310 of the embodiment is configured for keeping target the engine revolutions netgt itself being the transmission target control amount constant in a case where the target operating point of the engine 10 is within the optimum fuel economy range. The transmission control unit 130 controls the transmission ratio of the transmission 3 based on the target engine revolutions in a manner of bringing the actual engine revolutions to the target engine revolutions to control the shifting and accordingly executes the revolution fluctuation suppression shift control that suppresses fluctuations in engine revolutions in a case where the target operating point of the engine 10 is within the optimum fuel economy range.

Specifically, the target control amount calculating unit 310 of the embodiment is configured by including a target driving force calculating unit 311, a target output calculating unit 312, a target engine torque calculating unit 313, a target engine revolution calculating unit 314, an operating point judging unit 315, and a mediating unit 316.

The target driving force calculating unit 311 is for calculating target driving force Ftgt being driving force targeted by the vehicle 1 based on the present actual accelerator opening. After the accelerator opening sensor 56 and the wheel speed sensor 62 input the accelerator opening pa in accordance with a detection signal and the vehicle speed spd of the vehicle 1 in accordance with a detection signal, respectively, into the target driving force calculating unit 311, the target driving force calculating unit 311 calculates the target driving force Ftgt based on the present accelerator opening pa and the present vehicle speed spd. The target driving force Ftgt is driving force targeted by the vehicle 1 for realizing request driving force that a driver requests from the vehicle 1.

The target driving force calculating unit 311 obtains the target driving force Ftgt based on a driving force map m03 illustrated in FIG. 11, for example. In the driving force map m03, the horizontal axis indicates the vehicle speed spd, and the vertical axis the driving force F. The driving force map m03 describes the relationship between the vehicle speed spd and the driving force F at each accelerator opening pa. In the driving force map m03, the driving force F decreases with an increase in the vehicle speed spd and increases with an increase in the accelerator opening pa. The relationship between the vehicle speed spd, the accelerator opening pa, and the driving force F is preset in the driving force map m03 that is stored in the storage unit 51b. The target driving force calculating unit 311 obtains the target driving force Ftgt according to the accelerator opening pa and the vehicle speed spd based on the driving force map m03. The target driving force calculating unit 311 outputs the calculated target driving force Ftgt to the target output calculating unit 312.

The target output calculating unit 312 is for calculating target output petgt being output targeted by the engine 10 mounted on the vehicle 1 based on the target driving force and the present actual vehicle speed. After the target driving force calculating unit 311 and the wheel speed sensor 62 input the target driving force Ftgt and the vehicle speed spd of the vehicle 1 in accordance with a detection signal, respectively, into the target output calculating unit 312, the target output calculating unit 312 calculates the target output petgt based on the target driving force Ftgt and the present vehicle speed spd. The target output petgt is output targeted by the engine 10 to allow the vehicle 1 to obtain the target driving force Ftgt, in other words, output targeted by the engine 10 to realize the target driving force Ftgt of the vehicle 1 corresponding to request driving force that a driver requests from the vehicle 1. The target output calculating unit 312 calculates the target output petgt (target output petgt=target driving force Ftgt× vehicle speed spd) of the engine 10 by multiplying the target driving force Ftgt input from the target driving force calculating unit 311 by the present vehicle speed spd input from the wheel speed sensor 62, for example. The target output calculating unit 312 outputs the calculated target output petgt to the target engine torque calculating unit 313.

Here, the target engine revolution calculating unit 314 is for calculating assumed target engine revolutions netgt' as the transmission target control amount. After the accelerator opening sensor 56 and the wheel speed sensor 62 input the present actual accelerator opening pa in accordance with a detection signal and the present actual vehicle speed spd in accordance with a detection signal, respectively, into the target engine revolution calculating unit 314, the target engine revolution calculating unit 314 calculates the assumed target engine revolutions netgt' based on the accelerator opening pa and the vehicle speed spd. The target engine revolution calculating unit 314 obtains the assumed target engine revolutions netgt' according to the present accelerator opening pa and the present vehicle speed spd based on the engine revolution map m02 illustrated in FIG. 6, for example. The target engine revolution calculating unit 314 outputs the calculated assumed target engine revolutions netgt' to the target engine torque calculating unit 313 while outputting to the operating point judging unit 315. The target engine revolution calculating unit 314 further outputs the calculated assumed target engine revolutions netgt' to the mediating unit 316, too.

The target engine torque calculating unit 313 is for calculating target engine torque tetgt being engine torque targeted as the internal combustion engine target control amount based on the target output petgt and the assumed target engine revolutions netgt'. After the target output calculating unit 312 and the target engine revolution calculating unit 314 input the target output petgt and the assumed target engine revolutions netgt', respectively, into the target engine torque calculating unit 313, the target engine torque calculating unit 313 calculates the target engine torque tetgt based on the target output petgt and the assumed target engine revolutions netgt'. The target engine torque tetgt is engine torque targeted by the engine 10 to allow the engine 10 to obtain the target output petgt, and is engine torque that can realize the target output petgt at the assumed target engine revolutions netgt'. The target engine torque calculating unit 313 calculates the target engine torque tetgt (target engine torque tetgt=target output petgt/assumed target engine revolutions netgt') of the engine 10 by dividing the assumed target engine revolutions netgt' input from the target engine revolution calculating unit 314 into the target output petgt input from the target output calculating unit 312, for example. The target engine torque calculating unit 313 outputs the calculated target engine torque tetgt to the engine control unit 120 while outputting to the operating point judging unit 315.

The engine control unit 120 then controls the output of the engine 10 based on the target engine torque tetgt calculated by the target engine torque calculating unit 313 constituting the target control amount calculating unit 310.

The operating point judging unit 315 of the embodiment is for judging whether the target operating point of the engine 10 in accordance with the target engine torque and the target engine revolutions is within the optimum fuel economy range. The target engine torque calculating unit 313 and the target engine revolution calculating unit 314 input the target engine torque tetgt and the assumed target engine revolutions netgt', respectively, into the operating point judging unit 315. The operating point judging unit 315 judges whether the target operating point of the engine 10 in accordance with the input target engine torque tetgt and assumed target engine revolutions netgt' is within the optimum fuel economy range X. The operating point judging unit 315 outputs to the mediating unit 316 the judgment result showing whether the target operating point of the engine 10 is within the optimum fuel economy range X.

The mediating unit 316 is for mediating target engine revolutions netgt actually used for shift control based on the judgment result input from the operating point judging unit 315. In a case where the target operating point of the engine 10 in accordance with the target engine torque tetgt and the assumed target engine revolutions netgt' is out of the optimum fuel economy range X, the mediating unit 316 sets the assumed target engine revolutions netgt' in accordance with the present accelerator opening pa input from the target engine revolution calculating unit 314 to actual target engine revolutions netgt and outputs the target engine revolutions netgt to the transmission control unit 130.

On the other hand, in a case where the target operating point of the engine 10 in accordance with the target engine torque tetgt and the assumed target engine revolutions netgt' is within the optimum fuel economy range X, the mediating unit 316 keeps the target engine revolutions netgt constant without using the assumed target engine revolutions netgt' in accordance with the present accelerator opening pa input from the target engine revolution calculating unit 314. Furthermore, the mediating unit 316 sets, for example, target engine revolutions netgt of the previous control cycle (previous value) stored in the storage unit 51b to the target engine revolutions netgt of the present control cycle, and accordingly keeps the target engine revolutions netgt constant and outputs the target engine revolutions netgt to the transmission control unit 130.

After the mediating unit 316 constituting the target control amount calculating unit 310 inputs the target engine revolutions netgt mediated in accordance with the judgment result of the target operating point of the engine 10 into the transmission control unit 130, the transmission control unit 130 then controls the shifting of the transmission 3 based on the target engine revolutions netgt.

In short, in a case where the target operating point of the engine 10 is out of the optimum fuel economy range, the target control amount calculating unit 310 calculates both the target engine torque tetgt being the internal combustion engine target control amount and the target engine revolutions netgt being the transmission target control amount based on the present actual accelerator opening pa. In contrast, in a case where the target operating point of the engine 10 is within the optimum fuel economy range, the target control amount calculating unit 310 calculates the target engine torque tetgt being the internal combustion engine target control amount based on the present actual, accelerator opening pa while calculating the target engine revolutions netgt being the transmission target control amount not based on the present actual accelerator opening pa but by using the target engine revolutions netgt used in the previous control cycle.

In the driving force control device 300 configured as above, if the operating point judging unit 315 judges that the target operating point of the engine 10 is out of the optimum fuel economy range, the mediating unit 316 sets the assumed target engine revolutions netgt' in accordance with the present actual accelerator opening pa to the actual target engine revolutions netgt. As a result, in a case where the target operating point of the engine 10 is out of the optimum fuel economy range, the transmission control unit 130 controls the transmission ratio of the transmission 3 based on the target engine revolutions netgt that fluctuate in accordance with the present actual accelerator opening pa in a manner of bringing the actual engine revolutions ne to the target engine revolutions netgt to control the shifting. Therefore, the driving force control device 300 can execute normal shift control.

On the other hand, in the driving force control device 300, if the operating point judging unit 315 judges that the target operating point of the engine 10 is within the optimum fuel economy range, the mediating unit 113 sets the previous value as the target engine revolutions netgt; accordingly, in a case where the target operating point of the engine 10 is within the optimum fuel economy range, the target control amount calculating unit 110 can calculate the target engine revolutions netgt kept constant at the previous value. In short, in a case where the target operating point of the engine 10 is within the optimum fuel economy range, the driving force control device 300 can keep the target engine revolutions netgt approximately constant.

As a result, in a case where the target operating point of the engine 10 is within the optimum fuel economy range, the transmission control unit 130 controls the transmission ratio of the transmission 3 based on the target engine revolutions netgt kept approximately constant in a manner of bringing the actual engine revolutions ne to the target engine revolutions netgt to control the shifting; accordingly, in a case where the operating point of the engine 10 is within the optimum fuel economy range, the driving force control device 300 can keep the actual engine revolutions approximately constant and execute the revolution fluctuation suppression shift control that suppresses fluctuations in the accrual engine revolutions.

According to the driving force control device 300 according to the embodiment of the present invention described above, in a case where the operating point of the engine 10 is within the optimum fuel economy range, the driving force control device 300 executes the revolution fluctuation suppression shift control that suppresses fluctuations in engine revolutions and accordingly can suppress the deterioration of engine efficiency while suppressing the loss of inertia (rotational inertia) incident to a fluctuation in the revolutions of the engine 10. Therefore, it is possible to cope with both the suppression of the deterioration of engine efficiency and the suppression of the loss of inertia incident to a fluctuation in the revolutions of the engine 10, and it is possible to improve the efficiency of the whole driving system of the vehicle 1. Moreover, the driving force control device 300 executes the revolution fluctuation suppression shift control in accordance with a fact whether the target operating point of the engine 10 is within the optimum fuel economy range, and accordingly can execute the revolution fluctuation suppression shift control addictively based on the target operating point of the engine 10. Therefore, it is possible to improve the efficiency of the whole driving system of the vehicle 1 further.

(Fourth Embodiment)

Figure 12:
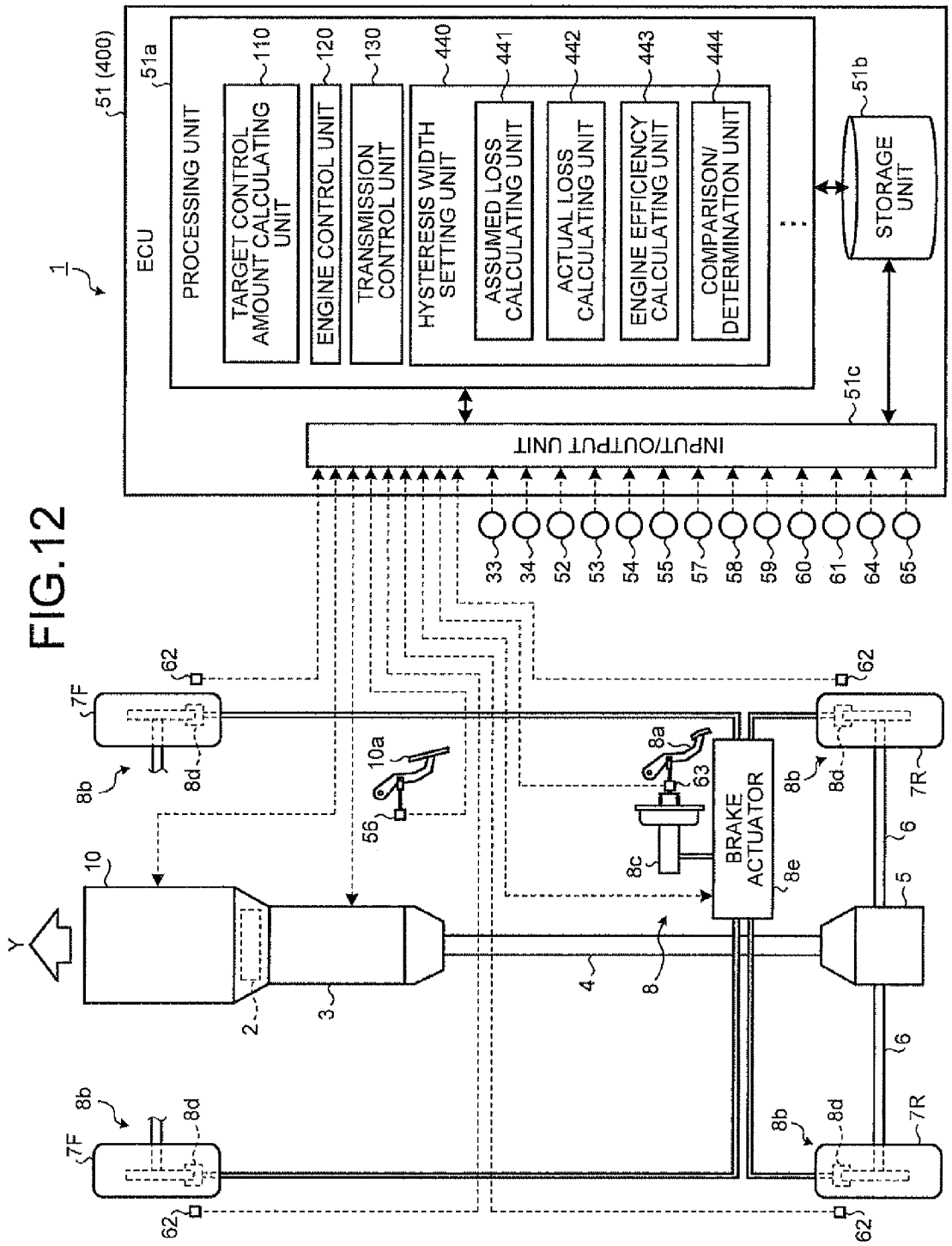
FIG. 12 is a schematic block diagram illustrating a vehicle to which a driving force control device according to a fourth embodiment of the present invention is applied.
Figure 13:
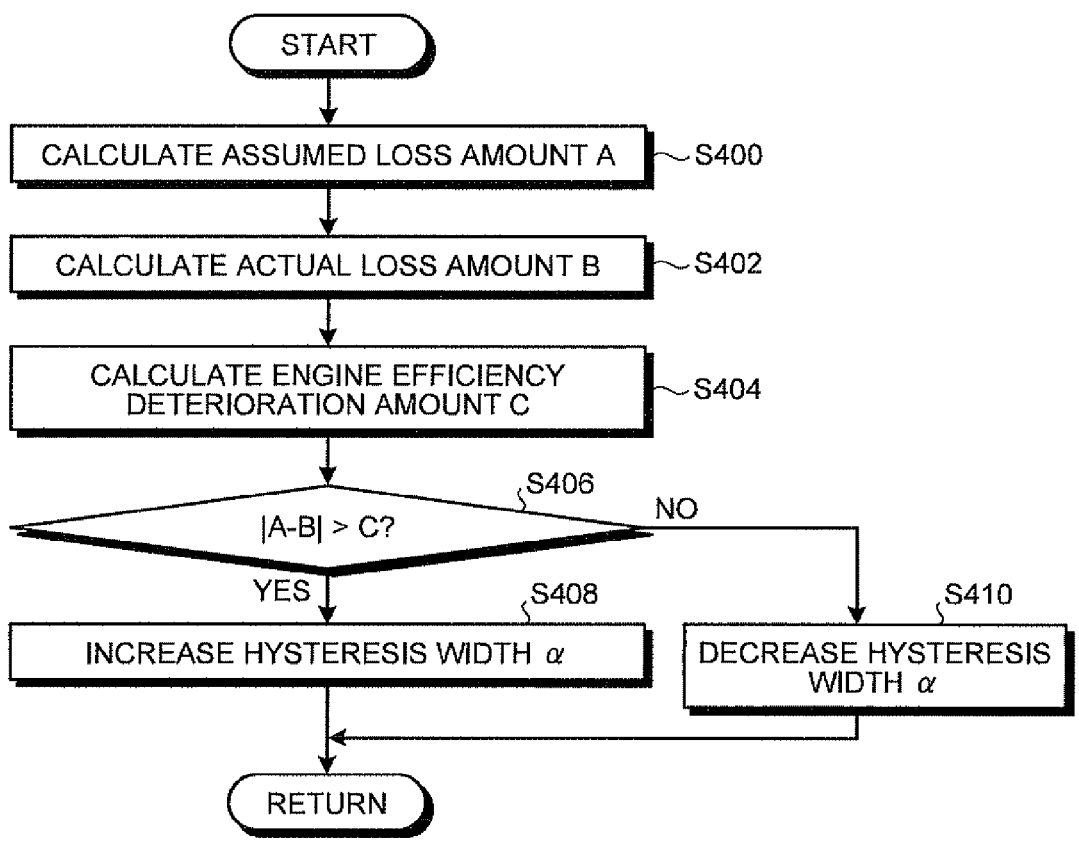
FIG. 13 is a flowchart describing hysteresis width setting control of the driving force control device according to the fourth embodiment of the present invention.

FIG. 12 is a schematic block diagram illustrating a vehicle to which a driving force control device according to a fourth embodiment of the present invention is applied. FIG. 13 is a flowchart describing hysteresis width setting control of the driving force control device according to the fourth embodiment of the present invention. The driving force control device according to the fourth embodiment has approximately the same configuration as that of the driving force control device according to the first embodiment; however, it is different from the driving force control device according to the first embodiment in a point of including setting means. Overlapped descriptions will be omitted of the other configurations, effects, and operations common to those of the above-mentioned embodiments as much as possible, and the same reference numerals will be attached to them.

As illustrated in FIG. 12, a driving force control device 400 of the embodiment functionally and conceptually includes the target control amount calculating unit 110 as target control amount calculation means, the engine control unit 120 as engine control means, and the transmission control unit 130 as shift control means.

Furthermore, the driving force control device 400 of the embodiment functionally and conceptually includes a hysteresis width setting unit 440 as setting means. The hysteresis width setting unit 440 sets the specified hysteresis width α (refer to FIG. 5) as appropriate based on the state of the vehicle 1; accordingly, it is encouraged to improve the efficiency of the whole driving system of the vehicle 1 further.

Specifically, the hysteresis width setting unit 440 is for setting the specified hysteresis width α based on the state of the vehicle 1. In other words, the hysteresis width setting unit 440 makes the specified hysteresis width α variable based on the state of the vehicle 1. As described above, the specified hysteresis width α is set with reference to the optimum fuel economy L. The optimum fuel economy range X is a region set with the hysteresis width α relative to the optimum fuel economy line L. Therefore, the hysteresis width setting unit 440 makes the hysteresis width α variable based on the state of the vehicle 1; accordingly, the optimum fuel economy range X, too, is made variable based on the state of the vehicle 1.

The hysteresis width setting unit 440 of the embodiment sets the specified hysteresis width α based on at least a loss incident to a fluctuation in engine revolutions and the engine efficiency of the engine 10. The hysteresis width setting unit 440 is configured by including an assumed loss calculating unit 441, an actual loss calculating unit 442, an engine efficiency calculating unit 443, and a comparison/determination unit 444.

The assumed loss calculating unit 441 is for calculating a loss incident to a fluctuation in engine revolutions in a case of assuming that the operating point of the engine 10 is on the optimum fuel economy line L, in other words, in a case of assuming that the engine 10 is operated at an operating point on the optimum fuel economy line L where the engine efficiency is the highest. The loss incident to a fluctuation in engine revolutions is typically a power loss equal to inertia (rotational inertia) torque incident to a fluctuation in the revolutions of the engine 10.

The assumed loss calculating unit 441 calculates assumed engine revolutions in a case of assuming that the operating point of the engine 10 is on the optimum fuel economy line L, and calculates a total of power losses equal to inertia torque incident to assumed fluctuations in the revolutions of the engine 10, in other words, assumed fluctuations in engine revolutions for a preset specified period. This is set to be an assumed loss amount. It is possible to calculate power losses equal to inertia torque incident to fluctuations in the revolutions of the engine 10 by various publicly known methods, for example, to calculate based on the mass rotational inertia and each fluctuation in speeds. The assumed loss calculating unit 441 calculates a total of the amounts of fuel consumption corresponding to power losses equal to inertia torque incident to fluctuations in the revolutions of the engine 10 for a preset specified period as an assumed loss amount, for example.

Incidentally, here, a description will be given assuming that the hysteresis width setting unit 440 calculates an assumed loss amount, an actual loss amount to be described later, and engine efficiency while adjusting them to a system of units of the amount of fuel consumption. However, the embodiment is not limited to this. It is sufficient if the hysteresis width setting unit 440 adjusts them to a unit comparable with each other as appropriate.

The actual loss calculating unit 442 is for calculating a loss incident to a fluctuation in engine revolutions at an actual operating point of the engine 10, in other words, a power loss equal to inertia (rotational inertia) torque. The actual loss calculating unit 442 calculates a total of power losses corresponding to inertia torque incident to fluctuations in the actual engine revolutions of the engine 10 for the same preset specified period as above, and this is set to be an actual loss amount. The actual loss calculating unit 442 calculates as an actual loss amount a total of the amounts of fuel consumption corresponding to power losses equal to inertia torque incident to fluctuations in the actual revolutions of the engine 10 for a preset specified period, for example.

An absolute value of a difference between the assumed loss amount calculated by the assumed loss calculating unit 441 and the actual loss amount calculated by the actual loss calculating unit 442 corresponds to a value in accordance with inertia (rotational inertia) losses that can actually be suppressed for the above preset specified period if the revolution fluctuation suppression shift control is executed on inertia (rotational inertia) losses incident to fluctuations in engine revolutions in a case of assuming that the engine 10 is operated at an operating point on the optimum fuel economy line L to suppress fluctuations in engine revolutions.

Incidentally, the assumed loss calculating unit 441 and the actual loss calculating unit 442 may be made to calculate while including, in addition to power losses equal to inertia torque incident to fluctuations in the revolutions of the engine 10, a total of power losses incident to the shifting of the transmission 3 (a total of the amounts of fuel consumption corresponding to the power losses) for the above present specified period, too, in the assumed loss amount and the actual loss amount, respectively. In other words, the hysteresis width setting unit 440 may be made to set the specified hysteresis width α in accordance with power losses incident to the shifting of the engine revolution speed by the transmission 3 to which the revolution output of the engine 10 is transferred. The power loss incident to the shifting by the transmission 3 is a power loss incident to the shifting operation of the transmission 3, and is a power loss generated in accordance with the magnitude of the hydraulic pressure of hydraulic fluid supplied to each type of hydraulic pressure chamber of the transmission 3. In this case, for example, the assumed loss calculating unit 441 and the actual loss calculating unit 442 may previously map corresponding relationships between the operation states such as the hydraulic pressure of hydraulic fluid and input torque to the transmission 3 and the amount of fuel consumption corresponding to the power loss incident to a fluctuation, and may calculate the amount of fuel consumption corresponding to the power loss incident to the shifting as appropriate based on the map in accordance with a detection signal of each type of sensor. In this case, the assumed loss calculating unit 441 and the actual loss calculating unit 442 calculates while including a total of power losses incident to the shifting by the transmission 3 for a specified period in an assumed loss amount and an actual loss amount, respectively; accordingly, the hysteresis width setting unit 440 can set the specified hysteresis width α more appropriately based on the state of the vehicle 1, in other words, can set the optimum fuel economy range X more appropriately based on the state of the vehicle 1. Consequently, it is possible to improve the efficiency of the whole driving system of the vehicle 1 further.

The engine efficiency calculating unit 443 is for calculating the engine efficiency of the engine 10. Furthermore, the engine efficiency calculating unit 443 calculates assumed engine efficiency in a case of assuming that the operating point of the engine 10 is on the optimum fuel economy line L, in other words, in a case of assuming that the engine 10 is operated at an operating point on the optimum fuel economy line L where the engine efficiency is the highest, and actual engine efficiency at the actual operating point of the engine 10, and calculates a difference between the assumed engine efficiency and the actual engine efficiency. The engine efficiency calculating unit 443 then calculates a total of differences between the assumed engine efficiency and the actual engine efficiency for the same preset specified period as the above, and sets it as the amount of the deterioration of engine efficiency. For example, the engine efficiency calculating unit 443 calculates a total of the amounts of fuel consumption corresponding to the differences between the assumed engine efficiency and the actual engine efficiency for the specified period as the amount of the deterioration of engine efficiency. Here, the engine efficiency can be calculated by various publicly-known methods, and for example, can be calculated based on things such as the amount of fuel consumption used in accordance with engine revolutions and engine torque corresponding to this. However, it is not limited to this.

The amount of the deterioration of engine efficiency calculated by the engine efficiency calculating unit 443 corresponds to a value in accordance with the deterioration of the actual engine efficiency in a case of operating the engine 10 at an operating point deviated from the optimum fuel economy line L by executing the revolution fluctuation suppression shift control and suppressing fluctuations in engine revolutions, compared with the engine efficiency in a case of assuming that the engine 10 is operated at an operating point on the optimum fuel economy line L.

Additionally, the comparison/determination unit 444 is for comparing an absolute value of a difference between the assumed loss amount calculated by the assumed loss calculating unit 441 and the actual loss amount calculated by the actual loss calculating unit 442 with the amount of the deterioration of engine efficiency calculated by the engine efficiency calculating unit 443, and setting the specified hysteresis width α in accordance with the comparison result. If the absolute value of the difference between the assumed loss amount and the actual loss amount is larger than the amount of the deterioration of engine efficiency, the comparison/determination unit 444 performs the setting by increasing the hysteresis width α relatively. In contrast, if the absolute value of the difference between an assumed loss amount and an actual loss amount is equal to or smaller than the amount of the deterioration of engine efficiency, the comparison/determination unit 444 performs the setting by decreasing the hysteresis width α relatively. For example, the comparison/determination unit 444 increases the hysteresis width α by a preset specified amount in a case of performing the setting by increasing the hysteresis width α relatively, and decreases the hysteresis width α by a preset specified amount in a case of performing the setting by decreasing the hysteresis width α relatively.

In short, if the absolute value of the difference between the assumed loss amount and the actual loss amount is larger than the amount of the deterioration of engine efficiency, in other words, if the loss of inertia (rotational inertia) that can actually be suppressed by executing the revolution fluctuation suppression shift control becomes relatively larger than the deterioration of engine efficiency in a case of operating the engine 10 at an operating point deviated from the optimum fuel economy line L; consequently, it is possible to improve the efficiency of the whole driving system of the vehicle 1, the comparison/determination unit 444 increases the hysteresis width α relatively, expands the optimum fuel economy range X, and expands an operation range for executing the revolution fluctuation suppression shift control. On the other hand, if the absolute value of the difference between the assumed loss amount and the actual loss amount is equal to or smaller than the amount of the deterioration of engine efficiency, in other words, if the loss of inertia (rotational inertia) that can actually be suppressed by executing the revolution fluctuation suppression shift control is relatively smaller than the deterioration of engine efficiency in a case of operating the engine 10 at an operating point deviated from the optimum fuel economy line L, the comparison/determination unit 444 decreases the hysteresis width α relatively, contracts the optimum fuel economy range X, and contracts the operation range for executing the revolution fluctuation suppression shift control.

To put it another way, the comparison/determination unit 444 compares the absolute value of the difference between the assumed loss amount and the actual loss amount with the amount of the deterioration of engine efficiency and accordingly can judge whether it is better to suppress the loss of inertia (rotational inertia) incident to a fluctuation in the revolutions of the engine 10 in order to improve the efficiency of the whole driving system of the vehicle 1 even if the engine efficiency deteriorates to some degree or it is better to suppress the deterioration of engine efficiency in order to improve the efficiency of the whole driving system of the vehicle 1 even if the loss of inertia (rotational inertia) incident to a fluctuation in the revolutions of the engine 10 is permitted. If the absolute value of the difference between the assumed loss amount and the actual loss amount is larger than the amount of the deterioration of engine efficiency, in other words, if it is better to suppress the loss of inertia (rotational inertia) incident to a fluctuation in the revolutions of the engine 10 in order to improve the efficiency of the whole driving system of the vehicle 1 even if the engine efficiency deteriorates to some degree, the comparison/determination unit 444 then increases the hysteresis width α relatively as described above. On the other hand, if the absolute value of the difference between the assumed loss amount and the actual loss amount is equal to or smaller than the amount of the deterioration of engine efficiency, in other words, if it is better to suppress the deterioration of engine efficiency in order to improve the efficiency of the whole driving system of the vehicle 1 even if the loss of inertia (rotational inertia) incident to a fluctuation in the revolutions of the engine 10 is permitted, the comparison/determination unit 444 decreases the hysteresis width α relatively as described above.

Incidentally, among operating states where it is better to suppress the loss of inertia (rotational inertia) incident to a fluctuation in the revolutions of the engine 10 by executing the revolution fluctuation suppression shift control in order to improve the efficiency of the whole driving system of the vehicle 1 even if the engine efficiency deteriorates to some degree, for example, there is an operating state where the frequency of fluctuations in accelerator openings due to a driver's operation on the accelerator pedal is relatively high. Among operating states where it is better to suppress the deterioration of engine efficiency in order to improve the efficiency of the whole driving system of the vehicle 1 even if the loss of inertia (rotational inertia) incident to a fluctuation in the revolutions of the engine 10 is permitted, for example, there is an operating state where the frequency of fluctuations in accelerator openings due to a driver's operation on the accelerator pedal is low.

The operating point judging unit 112 of the embodiment constituting the target control amount calculating unit 110 (refer to FIG. 3) then judges based on the optimum fuel economy range X (refer to FIG. 5) in accordance with the hysteresis width α set by the comparison/determination unit 444 of the hysteresis width setting unit 440 as described above whether the operating point of the engine 10 is within the optimum fuel economy range X. In a case where the operating point of the engine 10 is within the optimum fuel economy range X, the transmission control unit 130 executes the revolution fluctuation suppression shift control that suppresses fluctuations in engine revolutions as described above.

The hysteresis width setting unit 440 sets the specified hysteresis width α based on the state of the vehicle 1; accordingly, the driving force control device 400 configured as above can perform the setting more appropriately by adjusting the optimum fuel economy range X to the actual state of the vehicle 1. Therefore, it is possible to improve the efficiency of the whole driving system of the vehicle 1 further.

In other words, the hysteresis width setting unit 440 sets the specified hysteresis width α based on losses incident to fluctuations in engine revolutions and the engine efficiency of the engine 10; accordingly, the driving force control device 400 of the embodiment can judge whether it is better to suppress the loss of inertia incident to a fluctuation in the revolutions of the engine 10 in order to improve the efficiency of the whole driving system of the vehicle 1 even if the engine efficiency deteriorates to some degree or it is better to suppress the deterioration of engine efficiency in order to improve the efficiency of the whole driving system of the vehicle 1 even if the loss of inertia incident to a fluctuation in the revolutions of the engine 10 is permitted. The driving force control device 400 can set the hysteresis width α based on the judgment result.

For example, the driving force control device 400 has a tendency where fluctuations in engine revolutions become large easily and the loss of inertia becomes large easily in an operating state where the frequency of fluctuations in accelerator openings due to a driver's operation on the accelerator pedal is relatively high. In such a case, the hysteresis width α is increased relatively, and the optimum fuel economy range X being the operation range for executing the revolution fluctuation suppression shift control is expanded. Therefore, it is possible to improve the efficiency of the whole driving system of the vehicle 1 by suppressing the fluctuations in the revolutions of the engine 10 and suppressing the accompanying loss of inertia even if the engine efficiency deteriorates to some degree. Additionally, in this case, it is possible to suppress engine noise by suppressing fluctuations in the revolutions of the engine 10 as well as improve the responsiveness of the driving force of the vehicle 1 to the operation of the accelerator pedal by a driver by suppressing inertia torque.

On the other hand, the driving force control device 400 has a tendency where fluctuations in engine revolutions are small and the loss of inertia itself becomes small in an operating state where the frequency of fluctuations in accelerator openings due to a driver's operation on the accelerator pedal is relatively low. In such a case, the hysteresis width α is decreased relatively, and the optimum fuel economy range X being the operation range for executing the revolution fluctuation suppression shift control is contracted. Therefore, it is possible to improve the efficiency of the whole driving system of the vehicle 1 by suppressing the deterioration of engine efficiency even if the loss of inertia incident to a fluctuation in the revolutions of the engine 10 is permitted.

Next, with reference to the flowchart of FIG. 13, a description will be given of hysteresis width setting control of the ECU 51 also used as the driving force control device 400 according to the embodiment. Incidentally, these control routines are executed repeatedly in control cycles of several ms to several tens of ms.

Firstly, the assumed loss calculating unit 441 constituting the hysteresis width setting unit 440 of the driving force control device 400 calculates an assumed loss amount A for a preset specified period in a case of assuming that the operating point of the engine 10 is on the optimum fuel economy line L, in other words, in a case of assuming that the engine 10 is operated at an operating point on the optimum fuel economy line L where the engine efficiency is the highest (S400).

Next, the actual loss calculating unit 442 constituting the hysteresis width setting unit 440 calculates an actual loss amount B incident to actual fluctuations in engine revolutions for the same preset specified period as above (S402).

Next, the engine efficiency calculating unit 443 constituting the hysteresis width setting unit 440 calculates a total of differences between assumed engine efficiency and actual engine efficiency for the same preset specified period as above to calculate an engine efficiency deterioration amount C (S404).

Next, the comparison/determination unit 444 constituting the hysteresis width setting unit 440 compares an absolute value of a difference between the assumed loss amount A calculated by the assumed loss calculating unit 441 in S400 and the actual loss amount B calculated by the actual loss calculating unit 442 in S402 with the engine efficiency deterioration amount C calculated by the engine efficiency calculating unit 443 in S404, and judges whether the absolute value of the difference between the assumed loss amount A and the actual loss amount B is larger than the engine efficiency deterioration amount C (S406).

In a case of judging that the absolute value of the difference between the assumed loss amount A and the actual loss amount B is larger than the engine efficiency deterioration amount C (S406: Yes), the comparison/determination unit 444 increases the hysteresis width α relatively to expand the optimum fuel economy range X (S408), and terminates the present control cycle to move to the next control cycle.

In a case of judging that the absolute value of the difference between the assumed loss amount A and the actual loss amount B is equal to or smaller than the engine efficiency deterioration amount C (S406: No), the comparison/determination unit 444 decreases the hysteresis width α relatively to contract the optimum fuel economy range X (S410), and terminates the present control cycle to move to the next control cycle.

According to the driving force control device 400 according to the embodiment of the present invention described above, in a case where the operating point of the engine 10 is within the optimum fuel economy range, the driving force control device 400 executes the revolution fluctuation suppression shift control that suppresses fluctuations in engine revolutions and accordingly can suppress the deterioration of engine efficiency while suppressing the loss of inertia (rotational inertia) incident to a fluctuation in the revolutions of the engine 10. Therefore, it is possible to cope with both the suppression of the deterioration of engine efficiency and the suppression of the loss of inertia incident to a fluctuation in the revolutions of the engine 10, and consequently it is possible to improve the efficiency of the whole driving system of the vehicle 1.

Furthermore, according to the driving force control device 400 according to the embodiment of the present invention described above, included is the hysteresis width setting unit 440 for setting the specified hysteresis width based on the state of the vehicle. Therefore, the hysteresis width setting unit 440 sets the specified hysteresis width α based on the state of the vehicle 1; accordingly, the driving force control device 400 can perform the setting more appropriately by adjusting the optimum fuel range X to the actual state of the vehicle 1. Hence, it is possible to increase the efficiency of the whole driving system of the vehicle 1 further.

Furthermore, according to the driving force control device 400 according to the embodiment of the present invention described above, the hysteresis width setting unit 440 sets the specified hysteresis width based on losses incident to fluctuations in engine revolutions and the engine efficiency of the engine 10. Therefore, the hysteresis width setting unit 440 sets the specified hysteresis width α based on losses incident to fluctuations in engine revolutions and the engine efficiency of the engine 10; accordingly, the driving force control device 400 can judge whether it is better to suppress the loss of inertia incident to a fluctuation in the revolutions of the engine 10 in order to improve the efficiency of the whole driving system of the vehicle 1 even if the engine efficiency deteriorates to some degree or it is better to suppress the deterioration of engine efficiency in order to improve the efficiency of the whole driving system of the vehicle 1 even if the loss of inertia incident to a fluctuation in the revolutions of the engine 10 is permitted, and can set the hysteresis width α based on the judgment result. Consequently, it is possible to improve the efficiency of the whole driving system of the vehicle 1 further.

(Fifth Embodiment)

Figure 14:
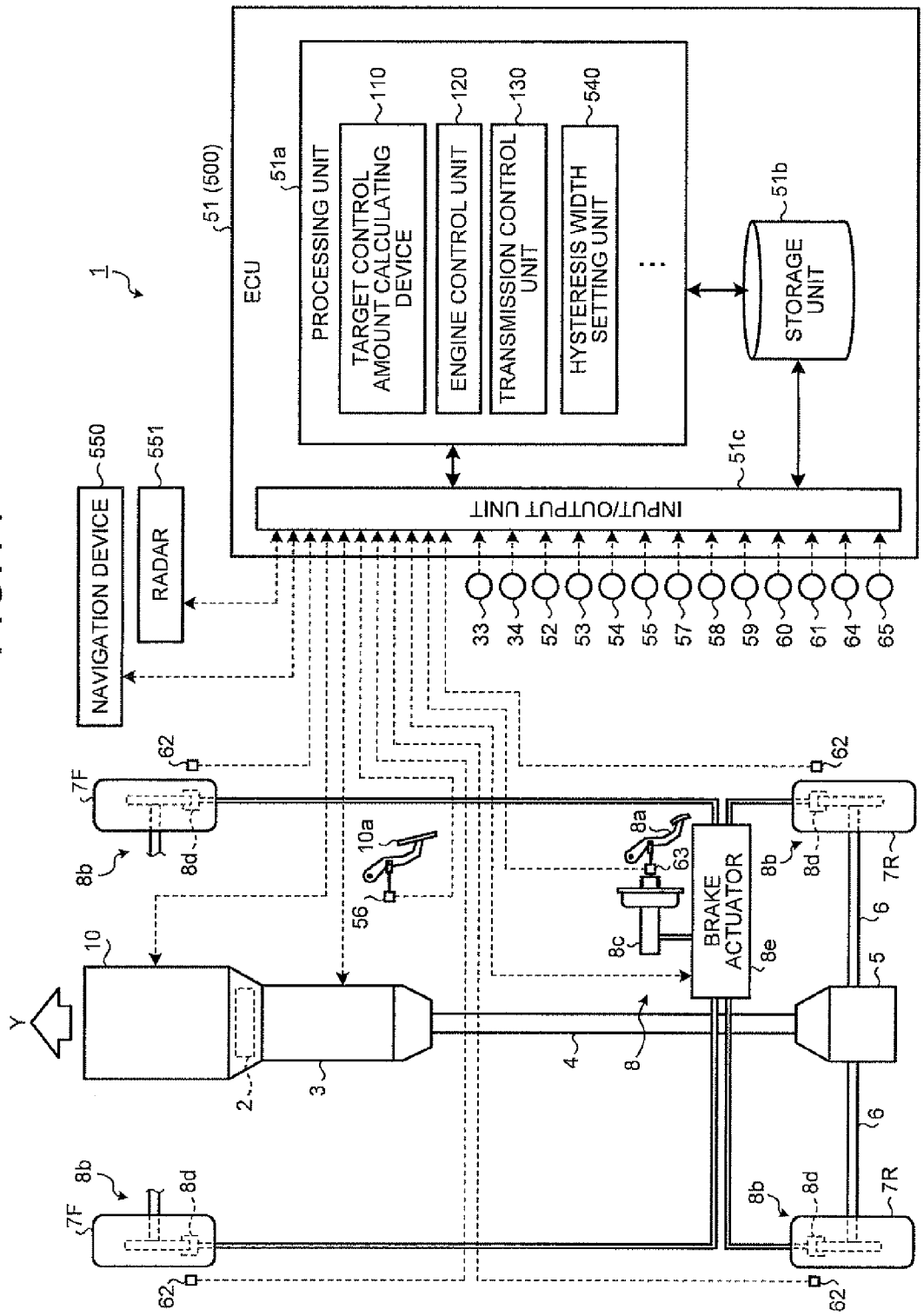
FIG. 14 is a schematic block diagram illustrating a vehicle to which a driving force control device according to a fifth embodiment of the present invention is applied.

FIG. 14 is a schematic block diagram illustrating a vehicle to which a driving force control device according to a fifth embodiment of the present invention is applied. FIGS. 15 to 22 are flowcharts describing hysteresis width setting control of the driving force control device according to the fifth embodiment of the present invention. The driving force control device according to the fifth embodiment has approximately the same configuration as that of the driving force control device according to the fourth embodiment; however, the configuration of setting means is different from that of the driving force control device according to the fourth embodiment. Overlapped descriptions will be omitted of the other configurations, effects, and operations common to those of the above-mentioned embodiments as much as possible, and the same reference numerals will be attached to them.

As illustrated in FIG. 14, a driving force control device 500 of the embodiment functionally and conceptually includes the target control amount calculating unit 110 as target control amount calculation means, the engine control unit 120 as engine control means, and the transmission control unit 130 as shift control means.

Furthermore, the driving force control device 500 of the embodiment functionally and conceptually includes a hysteresis width setting unit 540 as setting means. The hysteresis width setting unit 540 sets the specified hysteresis width α (refer to FIG. 5) appropriately based on the state of the vehicle 1; accordingly, it is possible to improve the efficiency of the whole driving system of the vehicle 1 as well as so-called drivability.

Specifically, the hysteresis width setting unit 540 is for setting the specified hysteresis width α based on the state of the vehicle 1. In other words, the hysteresis width setting unit 540 makes the specified hysteresis width α variable based on the state of the vehicle 1. The hysteresis width setting unit 540 makes the hysteresis width α variable based on the state of the vehicle 1; accordingly, the optimum fuel economy range X becomes variable based on the state of the vehicle 1.

Additionally, the hysteresis width setting unit 540 of the embodiment is configured for setting the specified width α based on the state of the vehicle 1 such as the operating state of the vehicle 1, a driving orientation state to the vehicle 1, and the running state of the vehicle 1.

In a case of setting the specified hysteresis width α based on the operating state of the vehicle 1, the hysteresis width setting unit 540 may set the specified hysteresis width α based on the vehicle speed of the vehicle 1, an accelerator opening as the operation amount of a driver's driving force request operation on the vehicle 1, and the like.

Specifically, the hysteresis width setting unit 540 may set the specified hysteresis width α based on the fluctuation width of the vehicle speed of the vehicle 1. In this case, the hysteresis width setting unit 540 acquires the vehicle speed of the vehicle 1 based on a detection signal of the wheel speed sensor 62, for example, always updates the fluctuation width of the vehicle speed within a preset specified period, and makes the specified hysteresis width α variable based on the fluctuation width of the vehicle speed.

Figure 15:
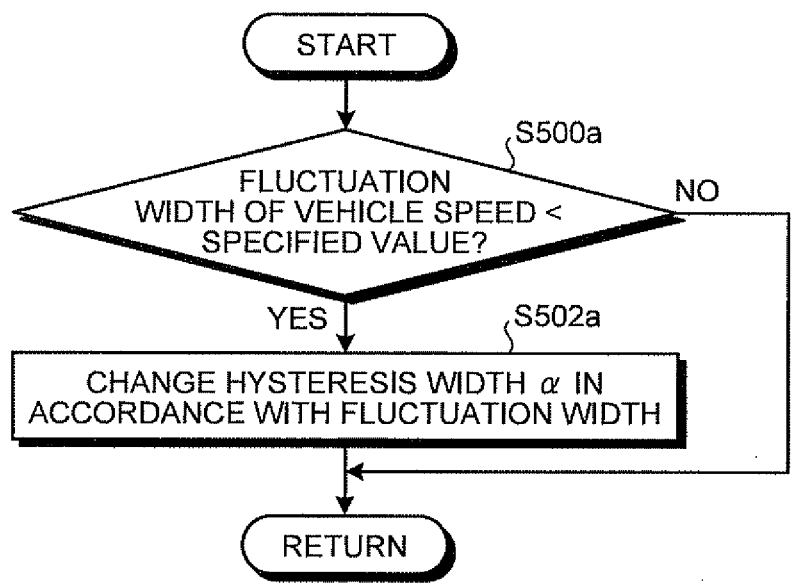
FIG. 15 is a flowchart describing hysteresis width setting control of the driving force control device according to the fifth embodiment of the present invention.

In this case, for example, as illustrated in the flowchart of FIG. 15 describing the hysteresis width setting control, the hysteresis width setting unit 540 judges whether the fluctuation width of the vehicle speed is smaller than a preset specified value (S500a). In a case of judging that the fluctuation width of the vehicle speed is equal to or larger than the specified value (S500a: No), the hysteresis width setting unit 540 terminates the present control cycle and moves to the next control cycle. In a case of judging that the fluctuation width of the vehicle speed is smaller than the specified value (S500a: Yes), in other words, in a case where the operating state of the vehicle 1 is a state close to a steady operation state, the hysteresis width setting unit 540 changes the hysteresis width α in accordance with the fluctuation width of the vehicle speed (S502a), terminates the present control cycle, and moves to the next control cycle. At this time, the hysteresis width setting unit 540 increases the hysteresis width α relatively as the fluctuation width of the vehicle speed becomes relatively smaller, expands the optimum fuel economy range X, and expands the operation region for executing the revolution fluctuation suppression shift control. In other words, the hysteresis width setting unit 540 decreases the hysteresis width α as the fluctuation width of the vehicle speed becomes relatively larger.

As a result, if the fluctuation width of the vehicle speed of the vehicle 1 is relatively small, and the operating state of the vehicle 1 is a state close to a steady operation state, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, the hysteresis width setting unit 540 may set the specified hysteresis width α based on a period during which the fluctuation width of the vehicle speed is within a preset specified range (first specified range). In this case, for example, the hysteresis width setting unit 540 acquires the vehicle speed of the vehicle 1 based on a detection signal of the wheel speed sensor 62, always updates the period during which the fluctuation width of the vehicle speed is within the specified range, and makes the specified hysteresis width α variable based on the period during which the fluctuation width of the vehicle speed is within the specified range.

Figure 16:
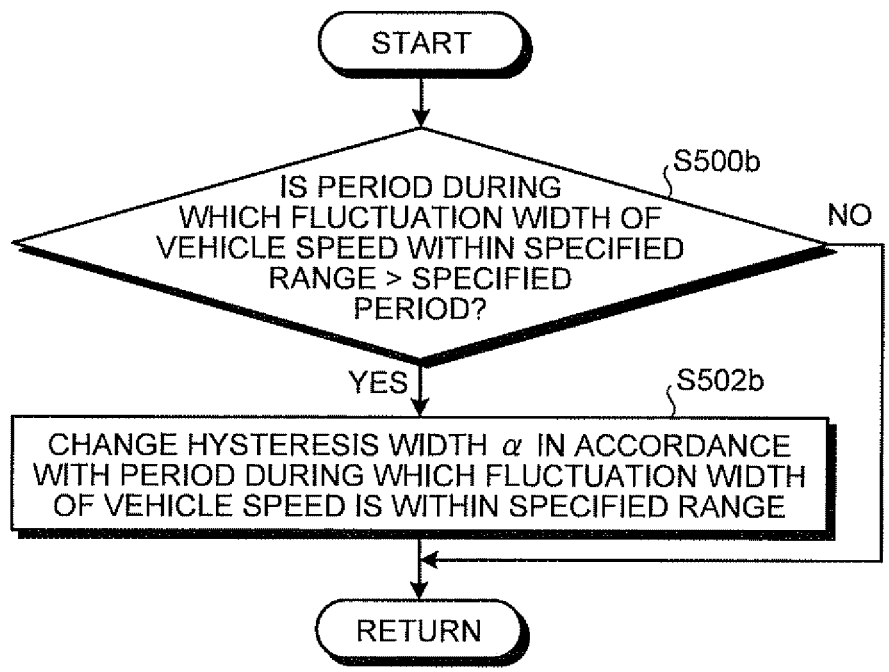
FIG. 16 is a flowchart describing the hysteresis width setting control of the driving force control device according to the fifth embodiment of the present invention.

In this case, for example, as illustrated in the flowchart of FIG. 16 describing the hysteresis width setting control, the hysteresis width setting unit 540 judges whether the period during which the fluctuation width of the vehicle speed is within the specified range is longer than a preset specified period (S500b). In a case of judging that the period during which the fluctuation width of the vehicle speed is within the specified range is equal to or shorter than the specified period (S500b: No), the hysteresis width setting unit 540 terminates the present control cycle, and moves to the next control cycle. In a case of judging that the period during which the fluctuation width of the vehicle speed is within the specified range is longer than the specified period (S500b: Yes), in other words, in a case where the operating state of the vehicle 1 is a state close to a steady operation state, the hysteresis width setting unit 540 changes the hysteresis width α in accordance with the period during which the fluctuation width of the vehicle speed is within the specified range (S502b), terminates the present control cycle, and moves to the next control cycle. At this time, the hysteresis width setting unit 540 increases the hysteresis width α relatively as the period during which the fluctuation width of the vehicle speed is within the specified range becomes relatively longer, expands the optimum fuel economy range X, and expands the operation region for executing the revolution fluctuation suppression shift control. In other words, the hysteresis width setting unit 540 decreases the hysteresis width α relatively as the period during which the fluctuation width of the vehicle speed is within the specified range becomes relatively shorter.

As a result, if the period during which the fluctuation width of the vehicle speed is within the specified range is relatively long and the operating state of the vehicle 1 is a state close to a steady operation state, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, the hysteresis width setting unit 540 may set the specified hysteresis width α based on a period during which the accelerator opening is within a preset specified range (second specified range). In this case, for example, the hysteresis width setting unit 540 acquires the accelerator opening based on a detection signal of the accelerator opening sensor 56, always updates the period during which the fluctuation width of the accelerator opening is within the specified range, and makes the specified hysteresis width α variable based on the period during which the fluctuation width of the accelerator opening is within the specified range.

Figure 17:
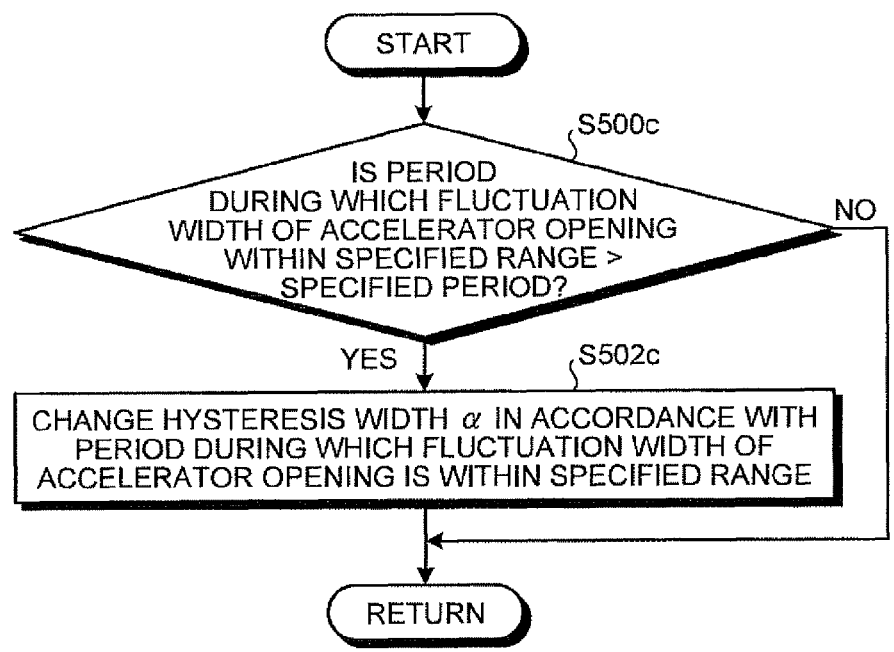
FIG. 17 is a flowchart describing the hysteresis width setting control of the driving force control device according to the fifth embodiment of the present invention.

In this case, for example, as illustrated in the flowchart of FIG. 17 describing the hysteresis width setting control, the hysteresis width setting unit 540 judges whether the period during which the fluctuation width of the accelerator opening is within the specified range is longer than a preset specified period (S500c). In a case of judging that the period during which the fluctuation width of the accelerator opening is within the specified range is equal to or shorter than the specified period (S500c: No), the hysteresis width setting unit 540 terminates the present control cycle, and moves to the next control cycle. In a case of judging that the period during which the fluctuation width of the accelerator opening is within the specified range is longer than the specified period (S500c: Yes), in other words, in a case where the operating state of the vehicle 1 is a state close to a steady operation state, the hysteresis width setting unit 540 changes the hysteresis width α in accordance with the period during which the fluctuation width of the accelerator opening is within the specified range (S502c), terminates the present control cycle, and moves to the next control cycle. At this time, the hysteresis width setting unit 540 increases the hysteresis width α relatively as the period during which the fluctuation width of the accelerator opening is within the specified range becomes relatively longer, expands the optimum fuel economy range X, and expands the operation region for executing the revolution fluctuation suppression shift control. In other words, the hysteresis width setting unit 540 decreases the hysteresis width α relatively as the period during which the fluctuation width of the accelerator opening is within the specified range becomes relatively shorter.

As a result, if the period during which the fluctuation width of the accelerator opening is within the specified range becomes relatively longer and the operating state of the vehicle 1 is a state close to a steady operation state, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, in a case of setting the specified hysteresis width α based on the driving orientation state of a driver to the vehicle 1, for example, the hysteresis width setting unit 540 may classify a driver's driving orientation to the vehicle 1 (for example, sports driving orientation and fuel economy driving orientation) with a driving orientation estimated value based on signals of various sensors and set the specified hysteresis width α based on this.

Specifically, the hysteresis width setting unit 540 may set the specified hysteresis width α based on a distribution rate of driving force realized by the vehicle 1 as the driving orientation estimated value, for example. In this case, the hysteresis width setting unit 540 acquires driving force realized by the vehicle 1 based on detection signals of various sensors, for example, always updates the distribution of the realized driving force, and makes the specified width α variable based on the distribution rate of the realized driving force.

Figure 18:
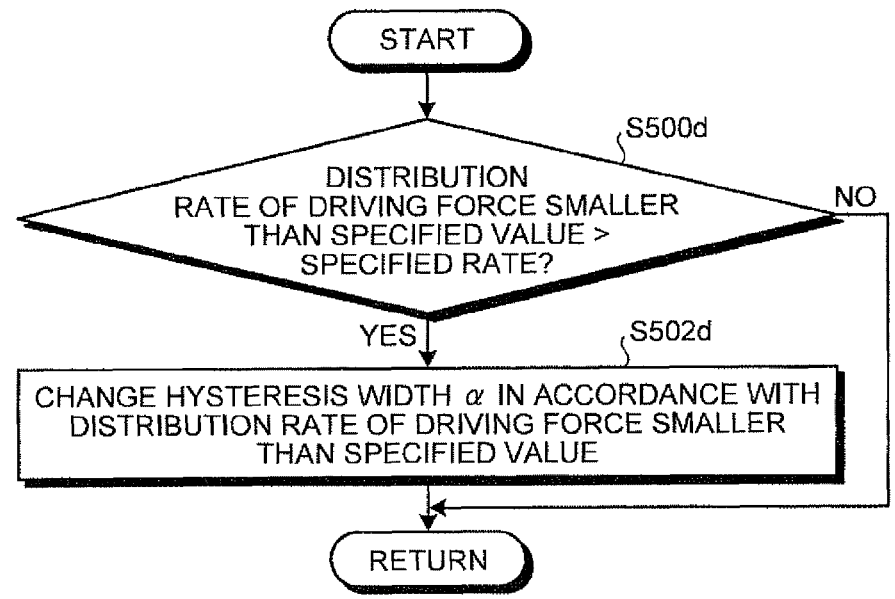
FIG. 18 is a flowchart describing the hysteresis width setting control of the driving force control device according to the fifth embodiment of the present invention.

In this case, for example, as illustrated in the flowchart of FIG. 18 describing the hysteresis width setting control, the hysteresis width setting unit 540 judges whether a distribution rate of driving force smaller than a preset specified value is higher than a preset specified rate (S500d). In a case of judging that the distribution rate of driving force smaller than the specified value is equal to or lower than the specified rate (S500d: No), the hysteresis width setting unit 540 terminates the present control cycle, and moves to the next control cycle. In a case of judging that the distribution rate of driving force smaller than the specified value is higher than the specified rate (S500d: Yes), in other words, in a case where the driving orientation is one that uses driving force smaller than the specified value relatively often, the hysteresis width setting unit 540 changes the hysteresis width α in accordance with the distribution rate of driving force smaller than the specified value (S502d), terminates the present control cycle, and moves to the next control cycle. At this time, the hysteresis width setting unit 540 increases the hysteresis width α relatively as the distribution rate of driving force smaller than the specified value becomes relatively higher, expands the optimum fuel economy range X, and expands the operation region for executing the revolution fluctuation suppression shift control. In other words, the hysteresis width setting unit 540 decreases the hysteresis width α relatively as the distribution rate of driving force smaller than the specified value becomes relatively lower.

As a result, in a case where the driving orientation is one that uses driving force smaller than the specified value relatively often, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, in a case of setting the specified hysteresis width α based on the running state of the vehicle 1, the hysteresis width setting unit 540 may set the specified hysteresis width α based on, for example, various types of road information such as speed limit information on a road where the vehicle 1 runs, traffic information on a road where the vehicle 1 runs, and corner information on a road where the vehicle 1 runs, and the state of a surrounding environment of the vehicle 1 including information on a distance between another vehicle as a running object running ahead of the vehicle 1 and the vehicle 1.

In this case, the driving force control device 500 should be connected to means for acquiring road information related to the state of a road on which the vehicle 1 runs and vehicle communication information related to other vehicles, for example, a navigation device 550 and a radar 551 as illustrated in FIG. 14. The navigation device 550 is mounted on the vehicle 1 and a basic function thereof is guiding the vehicle 1 to a specified destination. The navigation device 550 locates the present position of the vehicle 1 by using, for example, GPS (global positioning system) and autonomous navigation, inquires about road information necessary for the running of the vehicle 1 (map, straight roads, corners, uphills and downhills, highways, road traffic states, road types, speed limits, and the like) to acquire an optimum route to a destination, and guides a driving route to the destination on a display screen, for example. The navigation device 550 is connected to the driving force control device 500, and outputs various information to the driving force control device 500. The radar 551 is, for example, for performing vehicle communication with other vehicles, and for example, for receiving vehicle communication information from other vehicles. Moreover, the driving force control device 500 may be mounted on the vehicle 1 and may be connected to a vehicle-mounted camera (unillustrated) capable of imaging the outside of the vehicle 1, and the like.

Specifically, the hysteresis width setting unit 540 may set the specified hysteresis width α based on speed limit information on a road where the vehicle 1 runs. In this case, for example, the hysteresis width setting unit 540 acquires information on the present position of the vehicle 1 by GPS of the navigation device 550, acquires road information associated with the position from a map database of the navigation device 550, and acquires speed limit information being information related to a speed limit of a road (for example, a legal speed) where the vehicle 1 is currently running. Additionally, the hysteresis width setting unit 540 makes the specified hysteresis width α variable based on the speed limit information. Here, the hysteresis width setting unit 540 acquires the present vehicle speed of the vehicle 1, too, based on a detection signal of the wheel speed sensor 62, and makes the specified hysteresis width α variable based on a deviation between the speed limit in accordance with the speed limit information and the present vehicle speed.

Figure 19:
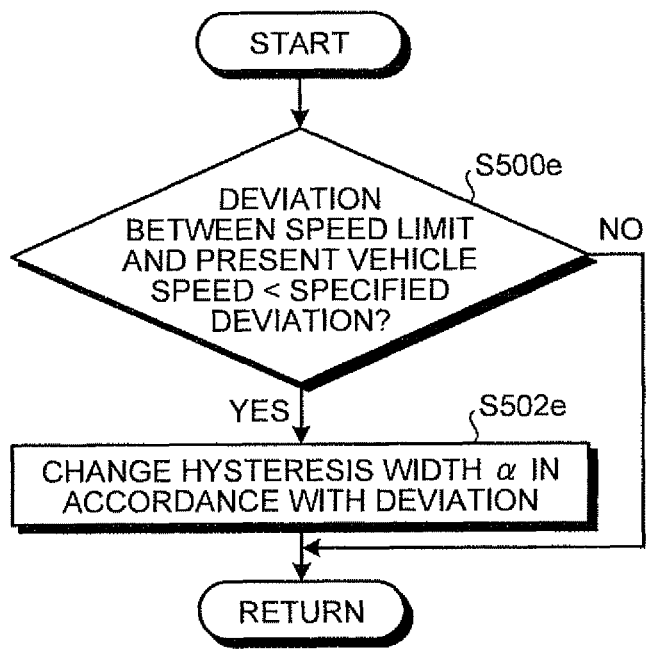
FIG. 19 is a flowchart describing the hysteresis width setting control of the driving force control device according to the fifth embodiment of the present invention.

In this case, for example, as illustrated in the flowchart of FIG. 19 describing the hysteresis width setting control, the hysteresis width setting unit 540 judges whether the deviation between the speed limit in accordance with the speed limit information and the present vehicle speed is smaller than a preset specified deviation (S500e). In a case of judging that the deviation between the speed limit in accordance with the speed limit information and the present vehicle speed is equal to or larger than the specified deviation (S500e: No), the hysteresis width setting unit 540 terminates the present control cycle, and moves to the next control cycle. In a case of judging that the deviation between the speed limit in accordance with the speed limit information and the present vehicle speed is smaller than the specified deviation (S500e: Yes), in other words, in a case where the vehicle speed of the vehicle 1 has already increased to near the speed limit, and it is possible to estimate that there will be relatively few acceleration/deceleration requests afterward, the hysteresis width setting unit 540 changes the hysteresis width α in accordance with the deviation between the speed limit and the present vehicle speed (S502e), terminates the present control cycle, and moves to the next control cycle. At this time, the hysteresis width setting unit 540 increases the hysteresis width α relatively as the deviation between the speed limit and the present vehicle speed becomes relatively smaller, expands the optimum fuel economy range X, and expands the operation region for executing the revolution fluctuation suppression shift control. To put it another way, the hysteresis width setting unit 540 decreases the hysteresis width α relatively as the deviation between the speed limit and the present vehicle speed becomes relatively larger.

As a result, in a case where the vehicle speed of the vehicle 1 has increased to near the speed limit, and it is possible to estimate that there will be relatively few acceleration/deceleration requests afterward, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, the hysteresis width setting unit 540 may set the specified hysteresis width α based on traffic information on a road where the vehicle 1 runs. In this case, for example, the hysteresis width setting unit 540 acquires information on the present position of the vehicle 1 by GPS of the navigation device 550 and the like, acquires road information on a road associated with the position from the map database of the navigation device 550, and acquires traffic information being information related to traffic congestion of a road where the vehicle 1 is currently running. Additionally, the hysteresis width setting unit 540 makes the specified hysteresis width α variable based on the traffic information.

Figure 20:
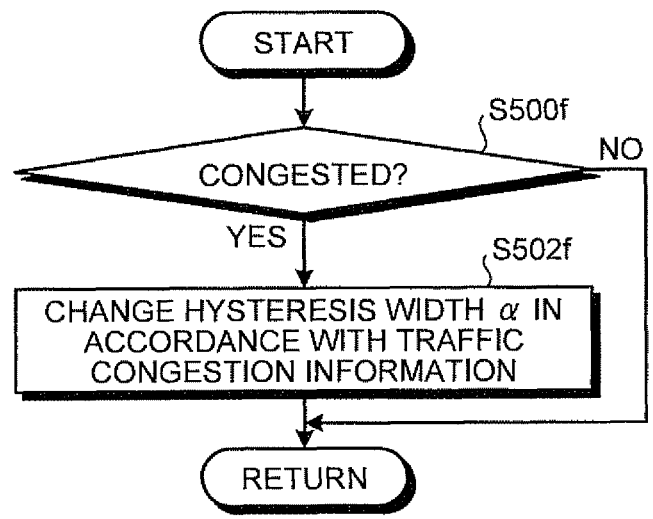
FIG. 20 is a flowchart describing the hysteresis width setting control of the driving force control device according to the fifth embodiment of the present invention.

In this case, for example, as illustrated in the flowchart of FIG. 20 describing the hysteresis width setting control, the hysteresis width setting unit 540 judges whether the road where the vehicle 1 is currently running is congested based on the traffic information (S500*f*). In a case of judging that it is not being congested based on the traffic congestion information (S500*f*: No), the hysteresis width setting unit 540 terminates the present control cycle, and moves to the next control cycle. In a case of judging that it is being congested (S500*f*: Yes), the hysteresis width setting unit 540 changes the hysteresis width α in accordance with the degree of traffic congestion based on the traffic information (S502*f*), terminates the present control cycle, and moves to the next control cycle. At this time, the hysteresis width setting unit 540 increases the hysteresis width α relatively as the degree of traffic congestion becomes higher, expands the optimum fuel economy range X, and expands the operation region for executing the revolution fluctuation suppression shift control. To put it another way, the hysteresis width setting unit 540 decreases the hysteresis width relatively α as the degree of traffic congestion becomes lower.

As a result, if the degree of traffic congestion is high, and acceleration and deceleration are repeated for a short time, and engine revolutions tend to fluctuate, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions and improve the efficiency of the whole driving system of the vehicle 1 as well as drivability.

Moreover, the hysteresis width setting unit 540 may set the specified hysteresis width α based on corner (curve) information on a road where the vehicle 1 runs. In this case, for example, the hysteresis width setting unit 540 acquires information on the present position of the vehicle 1 by GPS of the navigation device 550 and the like, acquires road information on a road associated with the position from the map database of the navigation device 550, and acquires corner information being information related to a corner (curve) of a road where the vehicle 1 is currently running. The hysteresis width setting unit 540 then makes the specified hysteresis width α variable based on the corner information.

Figure 21:
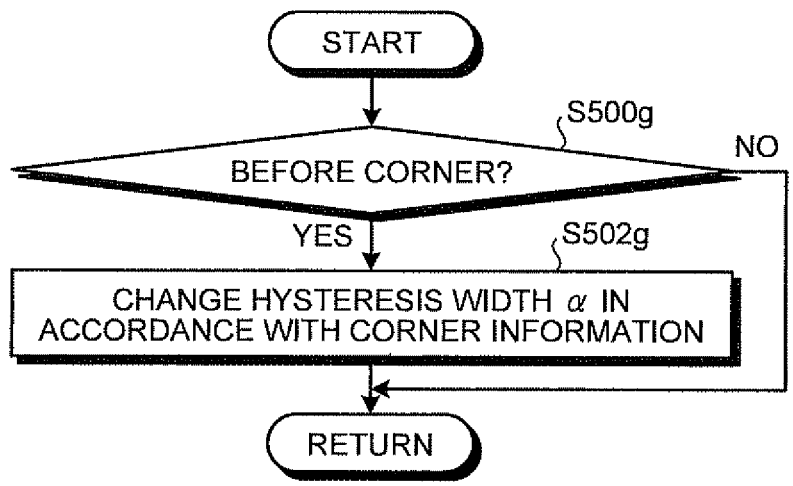
FIG. 21 is a flowchart describing the hysteresis width setting control of the driving force control device according to the fifth embodiment of the present invention.

In this case, for example, as illustrated in the flowchart of FIG. 21 describing the hysteresis width setting control, the hysteresis width setting unit 540 judges based on the corner information whether the road where the vehicle 1 is currently running is before a corner (S500*g*). In a case of judging that it is not before a corner based on the corner information (S500*g*: No), the hysteresis width setting unit 540 terminates the present control cycle, and moves to the next control cycle. In a case of judging that it is before a corner based on the corner information (S500*g*: Yes), the hysteresis width setting unit 540 changes the hysteresis width α in accordance with the curvature of the corner (curve) based on the corner information (S502*g*), terminates the present control cycle, and moves to the next control cycle. At this time, the hysteresis width setting unit 540 increases the hysteresis width α relatively as the curvature of the corner becomes larger (as the corner becomes tighter), expands the optimum fuel economy range X, and expands the operation region for executing the revolution fluctuation suppression shift control. To put it another way, the hysteresis width setting unit 540 decreases the hysteresis width α relatively as the curvature of the corner becomes smaller.

As a result, in a case of being in a state of being before a corner where a driver tends to return the accelerator pedal, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions, suppress a useless increase in engine revolutions, and improve the efficiency of the whole driving system of the vehicle 1 as well as drivability.

Moreover, the hysteresis width setting unit 540 may set the specified hysteresis width α based on information on a distance between another car running ahead of the vehicle 1 and the vehicle 1, to put it another way, following distance information. In this case, for example, the hysteresis width setting unit 540 acquires vehicle communication information by the radar 551, and acquires distance information (following distance information) being information related to the distance between another car running ahead of the vehicle 1 and the vehicle 1 based on the vehicle communication information. The hysteresis width setting unit 540 then makes the specified width α variable based on the information on the distance between another car running ahead of the vehicle 1 and the vehicle 1.

Figure 22:
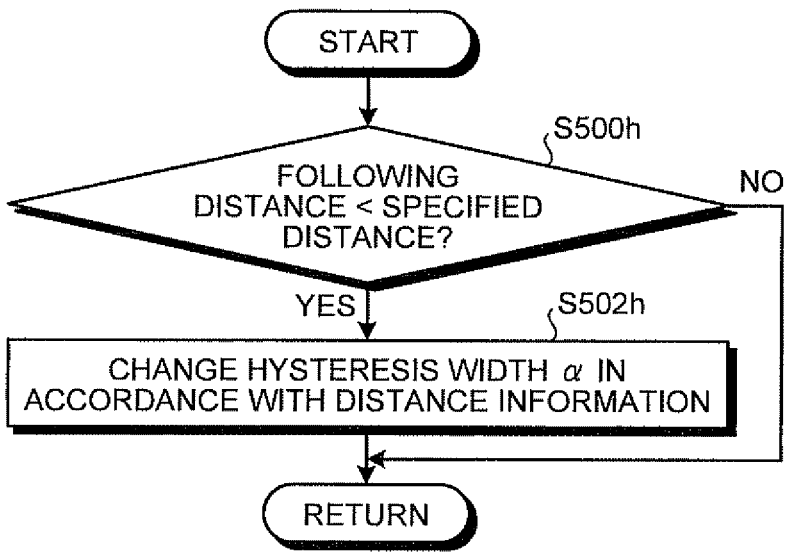
FIG. 22 is a flowchart describing the hysteresis width setting control of the driving force control device according to the fifth embodiment of the present invention.

In this case, for example, as illustrated in the flowchart of FIG. 22 describing the hysteresis width setting control, the hysteresis width setting unit 540 judges based on the distance information (vehicle communication information) whether a following distance between another car running ahead of the vehicle 1 and the vehicle 1 is shorter than a preset specified distance (S500*h*). In a case of judging that the following distance is longer than the specified distance (S500*h*: No), the hysteresis width setting unit 540 terminates the present control cycle, and moves to the next control cycle. In a case of judging that the following distance is shorter than the specified distance (S500*h*: Yes), the hysteresis width setting unit 540 changes the hysteresis width α in accordance with the distance information (S502*h*), terminates the present control cycle, and moves to the next control cycle. At this time, the hysteresis width setting unit 540 increases the hysteresis width α relatively as the following distance based on the distance information becomes shorter, expands the optimum fuel economy range X, and expands the operation region for executing the revolution fluctuation suppression shift control. To put it another ways, the hysteresis width setting unit 540 decreases the hysteresis width α as the following distance based on the distance information becomes longer.

As a result, if the distance between another vehicle running ahead and the vehicle 1 is relatively short, the hysteresis width setting unit 540 increases the hysteresis width α relatively, and expands the operation region for executing the revolution fluctuation suppression shift control. Therefore, the driving force control device 500 can suppress fluctuations in the revolutions of the engine 10 actively. Hence, it is possible to suppress sensitive fluctuations in engine revolutions, suppress a useless increase in engine revolutions, and improve the efficiency of the whole driving system of the vehicle 1 as well as drivability.

According to the driving force control device according to the embodiment of the present invention described above, in a case where the operating point of the engine 10 is within the optimum fuel economy range, the driving force control device 500 executes the revolution fluctuation suppression shift control that suppresses fluctuations in engine revolutions; accordingly, it is possible to suppress the deterioration of engine efficiency while suppressing the loss of inertia (rotational inertia) incident to a fluctuation in the revolutions of the engine 10. Therefore, it is possible to cope with both the suppression of the deterioration of engine efficiency and the suppression of the loss of inertia incident to a fluctuation of the revolutions of the engine 10. Hence, it is possible to improve the efficiency of the whole driving system of the vehicle 1.

Furthermore, according to the driving force control device 500 according to the embodiment of the present invention described above, the hysteresis width setting unit 540 sets the specified hysteresis width α based on the state of the vehicle 1; accordingly, the driving force control device 500 can perform the setting more appropriately by adjusting the optimum fuel economy range X to the actual state of the vehicle 1. Therefore, it is possible to improve the efficiency of the whole driving system of the vehicle 1 further.

Furthermore, according to the driving force control device 500 according to the embodiment of the present invention described above, the hysteresis width setting unit 540 may be configured for setting the specified hysteresis width α based on the operating state of the vehicle 1.

Furthermore, according to the driving force control device 500 according to the embodiment of the present invention described above, the hysteresis width setting unit 540 may be configured for setting the specified hysteresis width α based on a driving orientation state to the vehicle 1.

Furthermore, according to the driving force control device 500 according to the embodiment of the present invention described above, the hysteresis width setting unit 540 may be configured for setting the specified hysteresis width α based on the running state of the vehicle 1.

Furthermore, according to the driving force control device 500 according to the embodiment of the present invention described above, the hysteresis width setting unit 540 may be configured for setting the specified hysteresis width α based on any one of the fluctuation width of the vehicle speed of the vehicle 1, the period during which the fluctuation width of the vehicle speed is within the preset first specified range, the period during which the fluctuation width of an accelerator opening being the operation amount of driving force request operation on the vehicle 1 is within the preset second specified range, the distribution of driving force realized by the vehicle 1, the speed limit information on a road where the vehicle 1 runs, the traffic information on a road where the vehicle 1 runs, the corner information on a road where the vehicle 1 runs, and the information on a distance between a running object running ahead of the vehicle 1 and the vehicle 1.

In this case, the hysteresis width setting unit 540 sets the specified hysteresis width α appropriately based on the state of the vehicle 1; accordingly, the driving force control device 500 can improve the efficiency of the whole driving system of the vehicle 1 as well as drivability.

Incidentally, the above-mentioned driving force control device according to the embodiments of the present invention are not limited to the above-mentioned embodiments, and it is possible to make various modifications within the scope described in the claims. The driving force control device according to the embodiments of the present invention may be configured by combining a plurality of embodiments described above.

Moreover, although the description was given in the above description by applying a cylinder injection type of multi-cylinder engine as an internal combustion engine of the present invention, the engine is not limited to this type. The driving force control device of the present invention can apply any one of a straight engine, a V engine, and a port injection engine as an internal combustion engine, and it is possible to produce the same operation and effect in this case, too. Moreover, the combustion form is not limited to the above.

Moreover, although the description was given in the above description assuming that the accelerator opening detected by the accelerator opening sensor 56 is used as the operation amount of a driver's driving force request operation (acceleration request operation) on a vehicle, it is not limited to this.

INDUSTRIAL APPLICABILITY

As described above, the driving force control device according to the present invention can improve the efficiency of the whole driving system, and is suitable for a use for various driving force control devices for controlling the driving force of a vehicle.

The invention claimed is:

1. A driving force control device that controls engine torque generated by an internal combustion engine mounted on a vehicle and an engine revolution speed of the internal combustion engine based on an operation amount of driving force request operation on the vehicle to control driving force of the vehicle, comprising:
   a controller configured to execute revolution fluctuation suppression control that suppresses fluctuations in the actual engine revolution speeds by controlling output of the internal combustion engine based on the present actual operation amount of the driving force request operation while controlling shifting of a transmission to which revolution output of the internal combustion engine is transferred and which shifts the engine revolution speed when an operating point of the internal combustion engine in accordance with the engine torque and the engine revolution speed is within a region set with a specified hysteresis width relative to an optimum fuel economy line of the internal combustion engine.

2. The driving force control device according to claim 1, wherein the controller is configured to:
   calculate an internal combustion engine target control amount of the internal combustion engine and a transmission target control amount of a transmission to which revolution output of the internal combustion engine is transferred and which shifts the engine revolution speed, based on the operation amount of the driving force request operation;
   control output of the internal combustion engine based on the internal combustion engine target control amount;
   control shifting of the transmission based on the transmission target control amount, and
   calculate the transmission target control amount assuming that there is no change in the operation amount when the operating point of the internal combustion engine is within the region.

3. The driving force control device according to claim 1, wherein the controller is configured to:
- calculate an internal combustion engine target control amount of the internal combustion engine and a transmission target control amount of the transmission to which revolution output of the internal combustion engine is transferred and which shifts the engine revolution speed, based on the operation amount of the driving force request operation;
- control the output of the internal combustion engine based on the internal combustion engine target control amount; and
- control shifting of the transmission based on the transmission target control amount, the transmission target control amount being any one of a target input revolution speed which is a target of an input revolution speed for the transmission and a target engine revolution speed which is a target of the engine revolution speed; and
- keep the transmission target control amount when the operating point of the internal combustion engine is within the region.

4. The driving force control device according to claim 1, wherein the controller is configured to make the specified hysteresis width variable based on a state of the vehicle.

5. The driving force control device according to claim 4, wherein the controller is configured to set the specified hysteresis width based on a loss incident to a fluctuation in the engine revolution speeds and engine efficiency of the internal combustion engine.

6. The driving force control device according to claim 4, wherein the controller is configured to set the specified hysteresis width based on any one of a vehicle speed of the vehicle and the driving force request operation on the vehicle.

7. The driving force control device according to claim 4, wherein the controller is configured to set the specified hysteresis width based on a driving force realized by the vehicle.

8. The driving force control device according to claim 4, wherein the controller is configured to set the specified hysteresis width based on a state of a surrounding environment of the vehicle.

9. The driving force control device according to claim 4, wherein the controller is configured to set the specified hysteresis width based on any one of a fluctuation width of a vehicle speed of the vehicle, a period during which the fluctuation width of the vehicle speed is within a preset first specified range, a period during which a fluctuation width of the operation amount of the driving force request operation on the vehicle is within a preset second specified range, distribution of driving force realized by the vehicle, speed limit information on a road where the vehicle runs, traffic information on a road where the vehicle runs, corner information on a road where the vehicle runs, and information on a distance between a running object running ahead of the vehicle and the vehicle.

10. The driving force control device according to claim 1, wherein the controller is configured to:
- judge whether a target operating point in accordance with a target engine torque and a target revolutions is within the region; and
- execute the revolution fluctuation suppression control when the target operating point is within the region.

* * * * *